US012243088B2

(12) United States Patent
Hayes et al.

(10) Patent No.: US 12,243,088 B2
(45) Date of Patent: Mar. 4, 2025

(54) FOOTWEAR CONSTRUCTION WITH HYBRID MOLDS

(71) Applicant: Superfeet Worldwide LLC, Ferndale, WA (US)

(72) Inventors: Eric Paris Hayes, Ferndale, WA (US); Mike Zhuang, Ferndale, WA (US); Daniel Wakeland, Ferndale, WA (US)

(73) Assignee: Superfeet Worldwide LLC, Ferndale, WA (US)

( * ) Notice: Subject to any disclaimer, the term of this patent is extended or adjusted under 35 U.S.C. 154(b) by 457 days.

(21) Appl. No.: 17/493,729

(22) Filed: Oct. 4, 2021

(65) Prior Publication Data

US 2022/0108375 A1    Apr. 7, 2022

Related U.S. Application Data

(62) Division of application No. 16/171,199, filed on Oct. 25, 2018, now Pat. No. 11,138,650.

(51) Int. Cl.
*G06Q 30/06* (2023.01)
*A43D 1/02* (2006.01)
(Continued)

(52) U.S. Cl.
CPC ......... *G06Q 30/0631* (2013.01); *A43D 1/025* (2013.01); *A43D 1/06* (2013.01);
(Continued)

(58) Field of Classification Search
CPC .................... B29C 33/3842; B29D 35/0063
See application file for complete search history.

(56) References Cited

U.S. PATENT DOCUMENTS 5,790,256 A    8/1998    Brown et al.
6,546,356 B1   4/2003    Genest
(Continued)

FOREIGN PATENT DOCUMENTS

CN    101077236 A    11/2007
EP      2433516 A1     3/2012
(Continued)

OTHER PUBLICATIONS

2014 Interim Guidance on Subject Matter Eligibility; Jul. 2015 Update Appendix 1: Examples; 22 pages.
(Continued)

*Primary Examiner* — Larry W Thrower
(74) *Attorney, Agent, or Firm* — Lowe Graham Jones PLLC

(57) ABSTRACT

Embodiments are directed to manufacturing footwear. A first outer mold shell and a second outer mold shell may be provided. A first inner mold body and a second inner mold body may be manufactured. The first and second inner mold bodies may have respective first and second inner mold surfaces. The second inner mold surface, together with the first inner mold surface, may define an internal mold volume. The first and second inner mold bodies may be removably coupled to the respective first and second outer mold shells to form first and second hybrid side rings. The first hybrid side ring and the second hybrid side ring may be installed in an automated injection molding machine. The installed first hybrid side ring may be moved toward the installed second hybrid side ring to provide the internal mold volume. One or more liquids may be injected into the internal mold volume.

3 Claims, 20 Drawing Sheets

(51) Int. Cl.
   *A43D 1/06* (2006.01)
   *A43D 1/08* (2006.01)
   *B22F 10/20* (2021.01)
   *G06Q 30/0601* (2023.01)

(52) U.S. Cl.
   CPC .............. *A43D 1/08* (2013.01); *B22F 10/20* (2021.01); *G06Q 30/0621* (2013.01); *G06Q 30/0623* (2013.01)

(56) References Cited

U.S. PATENT DOCUMENTS

| | | | |
|---|---|---|---|
| 6,741,728 | B1 | 5/2004 | Genest |
| 6,823,550 | B2 | 11/2004 | Kantro |
| 8,095,426 | B2 | 1/2012 | Adelman et al. |
| 8,751,320 | B1 | 6/2014 | Kemist |
| 9,788,604 | B2 | 10/2017 | Jarvis |
| 10,013,711 | B2 | 7/2018 | Gooch et al. |
| 10,241,498 | B1 | 3/2019 | Beard et al. |
| 10,943,284 | B2 | 3/2021 | Gooch et al. |
| 2002/0023087 | A1 | 2/2002 | Vickery et al. |
| 2003/0089297 | A1 | 5/2003 | McNamara |
| 2003/0110095 | A1 | 6/2003 | Danenberg |
| 2004/0133431 | A1 | 7/2004 | Udiljak et al. |
| 2005/0049816 | A1 | 3/2005 | Oda et al. |
| 2007/0043582 | A1 | 2/2007 | Peveto et al. |
| 2007/0063378 | A1* | 3/2007 | O'Donoghue .......... B29C 33/40 425/406 |
| 2008/0292179 | A1 | 11/2008 | Busch |
| 2009/0182612 | A1 | 7/2009 | Challener et al. |
| 2009/0208113 | A1 | 8/2009 | Bar |
| 2009/0247909 | A1 | 10/2009 | Mukumoto |
| 2011/0055053 | A1 | 3/2011 | Rutschmann |
| 2011/0298897 | A1 | 12/2011 | Sareen et al. |
| 2013/0174445 | A1 | 7/2013 | Hakkala et al. |
| 2014/0012406 | A1 | 1/2014 | Cioffi et al. |
| 2014/0149072 | A1 | 5/2014 | Rutschmann |
| 2015/0032242 | A1 | 1/2015 | Schouwenburg et al. |
| 2016/0081435 | A1 | 3/2016 | Marks |
| 2016/0107391 | A1 | 4/2016 | Parish et al. |
| 2016/0206242 | A1 | 7/2016 | Esposito et al. |
| 2018/0153252 | A1* | 6/2018 | Archer ..................... A43B 9/18 |

FOREIGN PATENT DOCUMENTS

| | | |
|---|---|---|
| JP | 2008237833 A | 10/2008 |
| JP | 2012243052 A | 12/2012 |
| JP | 2013017822 A | 1/2013 |
| KR | 10-2002-0000979 | 1/2002 |
| KR | 10-2010-0087090 | 8/2010 |
| KR | 10-2013-0031073 | 3/2013 |
| KR | 10-2013-0034250 | 4/2013 |
| WO | 2005006905 A1 | 1/2005 |
| WO | 2013026798 A1 | 2/2013 |

OTHER PUBLICATIONS

*MCRO, Inc.* v. *Bandai Namco Games America*; United States Court of Appeals For The Federal Circuit; Dated Sep. 13, 2016; 27 pages.
Memorandum: Recent Subject Matter Eligibility Decisions; United States Patent and Trademark Office; Dated Nov. 2, 2016; 4 pages.
International Search Report and Written Opinion dated Jan. 29, 2016 for PCT Application No. PCT/US2015/057408; pp. 11.
Mills, Kathryn et al., "Identifying Clinically Meaningful Tools for Measuring Comfort Perception of Footwear," Medicine & Science in Sports & Exercise, Oct. 2010, 42.10: pp. 1966-1971.

* cited by examiner

FOOTWEAR CONSTRUCTION WITH HYBRID MOLDS

PRIORITY CLAIMS

This patent application is a Divisional of U.S. patent application Ser. No. 16/171,199, entitled FOOTWEAR CONSTRUCTION WITH HYBRID MOLDS, filed Oct. 25, 2018, the entirety of which is hereby incorporated by reference.

FIELD OF THE INVENTION

This application relates to product construction with molds and, more particularly, yet not exclusively, product construction with hybrid molds that have multiple portions fabricated with different materials, structures, or processes.

BACKGROUND OF THE INVENTION

Constructing products, such as footwear, in high volumes typically involves an automated process with an automation machine, such as machines available under the mark DESMA™. The machine typically has multiple stations arranged in a carousel loop. Each station often includes an arm carrying a footwear last and a midsole mold or an outsole mold. The carousel rotates a predetermined amount and stops such that one or more of the stations align with various work cells. Each cell typically handles one aspect of the construction such that a single shoe is constructed per lap of a given station through the loop. Typically, an upper is secured on each last at each carousel station. The station then serially transitions from one cell or stage in the loop to the next, pausing at each cell position associated with each stage until the stage is completed. A shoe is usually completed when a station associated with the shoe has completed the loop.

Each carousel station usually has a mold, such as the midsole mold or the outsole mold. The molds typically have two separate halves (often a left half and a right half) that, when brought together, define an interior volume that corresponds to the shape and dimensions of at least the outsole and the midsole of the shoe model. Often, the molds are brought together with the upper on the last positioned in the interior volume (and often with an outsole positioned in the bottom of the interior volume), and material is injected into the interior volume. As the material cures, it typically couples to the upper (and often to an outsole), and the molds can be separated to facilitate removing the shoe.

A standard mold is made of a single material, usually aluminum, and is typically milled with a Computer Numeric Control (CNC) machine. The mold is typically specific to the model of the shoe being constructed. Accordingly, for every shoe model and for every shoe size, a mold is milled from an aluminum block for every carousel station of the automation machine. Typically, an automation machine has 12, 24, or 30 stations, with each station having a mold that costs approximately $3,000-$4,000. Sometimes compression molds or cold-cement-line molds are employed to reduce costs, yet these alternative molds typically require significantly more human intervention than milled molds. Thus, it is with regard to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Preferred Embodiment, which is to be read in association with the accompanying drawings, wherein.

SUMMARY OF THE INVENTION

Figure 1:
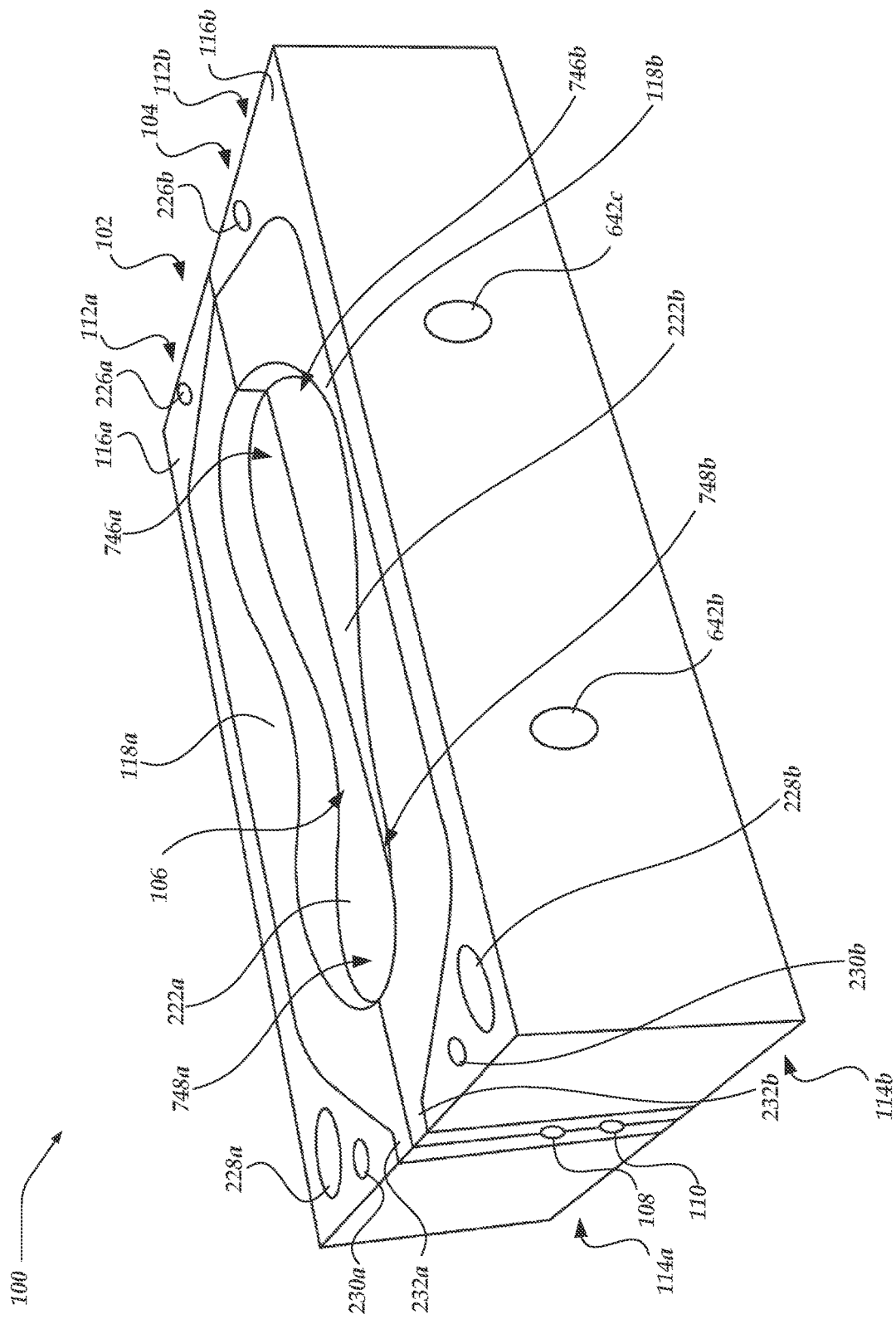
FIG. 1 shows a perspective view of an example hybrid mold, including example hybrid side rings in a joint configuration, that defines an example internal volume.

The following briefly describes example embodiments of the invention in order to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed to a method of manufacturing footwear. In one or more of the various embodiments, a first outer mold shell and a second outer mold shell may be provided. In some of the various embodiments, a first inner mold body and a second inner mold body may be manufactured. In some embodiments, the first inner mold body may have a first inner mold surface. In some embodiments, the second inner mold body may have a second inner mold surface that, together with the first inner mold surface of the first inner mold body, may define an internal mold volume that defines a shape of one or more portions of a first footwear item to be manufactured. In some embodiments, the first inner mold body may be removably coupled to the first outer mold shell to form a first hybrid side ring. In some embodiments, the second inner mold body may be removably coupled to the second outer mold shell to form a second hybrid side ring. In some embodiments, the first hybrid side ring and the second hybrid side ring may be installed in an automated injection molding machine. In some embodiments, the installed first hybrid side ring may be moved toward the installed second hybrid side ring to provide the internal mold volume. In some embodiments, one or more liquids may be injected into the internal mold volume to form the one or more portions of the first footwear item.

In one or more of the various embodiments, the first outer mold shell and the second outer mold shell may be manufactured with a subtractive manufacturing process.

In one or more of the various embodiments, the first outer mold shell and the second outer mold shell include aluminum.

In one or more of the various embodiments, the first inner mold body and the second inner mold body may be manufactured with an additive manufacture process.

In one or more of the various embodiments, the first inner mold body and the second inner mold body may include different material than the first outer mold shell and the second outer mold shell.

In one or more of the various embodiments, the first inner mold body and the second inner mold body may include nylon.

In one or more of the various embodiments, metal may be sintered to form the first inner mold body and the second inner mold body.

In one or more of the various embodiments, a third inner mold body and a fourth inner mold body may be manufactured. In some of the various embodiments, the third inner mold body may have a third inner mold surface. In some embodiments, the fourth inner mold body may have a fourth inner mold surface that, together with the third inner mold surface of the third inner mold body, may define a second internal mold volume that defines a shape of one or more portions of a second footwear item to be manufactured. In some embodiments, the one or more portions of the second footwear item may have one or more features that are distinct from one or more corresponding features of the one or more portions of the first footwear item. In some embodiments, the first inner mold body may be removed from the first outer mold shell. In some embodiments, the second inner mold body may be removed from the second outer mold shell. In some embodiments, the third inner mold body may be removably coupled to the first outer mold shell to form a third hybrid side ring. In some embodiments, the fourth inner mold body may be removably coupled to the second outer mold shell to form a fourth hybrid side ring. In some embodiments, the third hybrid side ring and the fourth hybrid side ring may be installed in the automated injection molding machine. In some embodiments, the installed third hybrid side ring may be moved toward the installed fourth hybrid side ring toward to provide the second internal mold volume. In some embodiments, one or more liquids may be injected into the second internal mold volume to form the one or more portions of the second footwear item.

In one or more of the various embodiments, one or more of the first inner mold body or the second inner mold body may form one or more portions of one or more injection ports. In some of the various embodiments, the one or more liquids may be injected through the one or more injection ports.

In one or more of the various embodiments, the first outer mold shell may have a first outer edge. In some of the various embodiments, the second outer mold shell may have a second outer edge. In some embodiments, the first edge and the second outer edge may define an outer perimeter of a hybrid mold when the installed first hybrid side ring is moved toward the installed second hybrid side ring to provide the internal mold volume. In some embodiments, one or more of the first inner mold body or the second inner mold body may have one or more extension portions that, after one or more of the first inner mold body is removably coupled to the first outer mold shell or the second inner mold body is removably coupled to the second outer mold shell, may extend at least to one or more of the first outer edge of the first outer mold shell or the second outer edge of the second outer mold shell. In some embodiments, one or more portions of one or more injection ports may extend through the one or more extension portions. In some embodiments, the one or more injection ports may provide fluid communication between the outer perimeter of the hybrid mold and the internal mold volume.

In one or more of the various embodiments, the one or more portions of the first footwear item may have a standard orientation defined by a bottom surface of the footwear item being at rest on a horizontal surface. In some of the various embodiments, the internal mold volume may have a modified orientation after the first hybrid side ring and the second hybrid side ring are installed in the automated injection molding machine. In some embodiments, the modified orientation is rotationally offset around a horizontal axis relative to the standard orientation.

In one or more of the various embodiments, the one or more portions of the first footwear item may have a standard orientation defined by a bottom surface of the footwear item being at rest on a horizontal surface. In some of the various embodiments, the internal mold volume may have a modified orientation after the first hybrid side ring and the second hybrid side ring are installed in the automated injection molding machine. In some embodiments, the modified orientation is rotationally offset by at least 10° around a horizontal axis relative to the standard orientation.

In one or more of the various embodiments, the first outer mold shell may have a first inner surface that has a first inner shape. In some of the various embodiments, the second outer mold shell may have a second inner surface that has a second inner shape. In some embodiments, the first inner mold body may have a first outer surface that has a first outer shape that may conform to the first inner shape of the first outer mold shell. In some embodiments, the second inner mold body may have a second outer surface that has a second outer shape that may conform to the second inner shape of the second outer mold shell.

In one or more of the various embodiments, the first outer mold shell may have a first inner surface. In some of the various embodiments, the second outer mold shell may have a second inner surface. In some embodiments, the first inner mold body may have a first outer surface. In some embodiments, the second inner mold body may have a second outer surface. In some embodiments, the first inner mold body may be removably coupled to the first outer mold shell with the first outer surface of the first inner mold body facing the first inner surface of the first outer mold shell. In some embodiments, the second inner mold body may be removably coupled to the second outer mold shell with the second outer surface of the second inner mold body facing the second inner surface of the second outer mold shell.

In one or more of the various embodiments, the first inner mold body and the second inner mold body may be manufactured based on foot information obtained from a scanner that scans a one or more portions of a consumer's foot.

Also, briefly stated, various embodiments are directed to a hybrid mold for manufacturing footwear with an automated injection molding machine. In one or more of the various embodiments, the hybrid mold may include a first hybrid side ring and a second hybrid side ring. In some of the various embodiments, the first hybrid side ring may include a first outer mold shell and a first inner mold body removably coupled to the first outer mold shell. In some embodiments, the first inner mold body may have a first inner mold surface. In some embodiments, the second hybrid side ring may include a second outer mold shell and a second inner mold body removably coupled to the second outer mold shell. In some embodiments, the second inner mold body may have a second inner mold surface that, together with the first inner mold surface of the first inner mold body, defines a first internal mold volume that defines a shape of one or more portions of a first footwear item to be manufactured.

In one or more of the various embodiments, the first inner mold body and the second inner mold body may include different material than the first outer mold shell and the second outer mold shell.

In one or more of the various embodiments, a third inner mold body may removably couple to the first outer mold shell. In some of the various embodiments, the third inner mold body may have a third inner mold surface. In some embodiments, a fourth inner mold body may removably couple to the second outer mold shell. In some embodiments, the fourth inner mold body may have a fourth inner mold surface that, together with the third inner mold surface of the third inner mold body, defines a second internal mold volume that defines a shape of one or more portions of a second footwear item to be manufactured. In some embodiments, the one or more portions of the second footwear item may have one or more features that are distinct from one or more corresponding features of the one or more portions of the first footwear item.

Also briefly stated, various embodiments are directed to a hybrid mold for manufacturing objects with an automated injection molding machine. In one or more of the various embodiments, the hybrid mold may include a first hybrid side ring and a second hybrid side ring. In some of the various embodiments, the first hybrid side ring may include a first outer mold shell and a first inner mold body removably coupled to the first outer mold shell. In some embodiments, the first inner mold body may have a first inner mold surface. In some embodiments, the second hybrid side ring may include a second outer mold shell and a second inner mold body removably coupled to the second outer mold shell. In some embodiments, the second inner mold body may have a second inner mold surface that, together with the first inner mold surface of the first inner mold body, defines a first internal mold volume that defines a shape of one or more portions of a first object to be manufactured.

In one or more of the various embodiments, a third inner mold body may removably couple to the first outer mold shell. In some of the various embodiments, the third inner mold body may have a third inner mold surface. In some embodiments, a fourth inner mold body may removably couple to the second outer mold shell. In some embodiments, the fourth inner mold body may have a fourth inner mold surface that, together with the third inner mold surface of the third inner mold body, defines a second internal mold volume that defines a shape of one or more portions of a second object to be manufactured. In some embodiments, the one or more portions of the second object may have one or more features that are distinct from one or more corresponding features of the one or more portions of the first object.

DETAILED DESCRIPTION OF THE PREFERRED EMBODIMENT

The various embodiments now will be described more fully hereinafter with reference to the accompanying drawings, which form a part hereof and show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Also, plural references are intended to also disclose the singular, unless the context clearly dictates otherwise. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

FIG. 1 shows a perspective view of example hybrid mold 100. In one or more of the various embodiments, hybrid mold 100 may include multiple side rings, such as left-side ring 102 and right-side ring 104. In some of the various embodiments, left-side ring 102 and right-side ring 104 may be separable from each other and may be transitioned between a joint configuration (for example, the joint configuration shown in FIG. 1) and a separated configuration (for example, the separated configuration shown in FIG. 2). In some embodiments, in the joint configuration, left-side ring 102 and right-side ring 104 define one or more internal volumes, such as internal volume 106. In some embodiments, in the joint configuration, left-side ring 102 and right-side ring 104 may define one or more injection ports, such as upper injection port 108 and lower injection port 110. In some embodiments, the injection ports facilitate injecting injection material (for example, polyethylene, polyurethane or others) into internal volume 106 to form one or more portions of an object, such as one or more of a midsole or an outsole of a shoe.

In one or more of the various embodiments, each side ring may have a front-end portion, such as left front-end portion 112a and right front-end portion 112b, and a rear-end portion, such as left rear-end portion 114a and right rear-end portion 114b. In some of the various embodiments, each side ring may have an outer mold shell, such as left shell 116a and right shell 116b. In some embodiments, each side ring may have an inner mold body, such as left body 118a and right body 118b.

In one or more of the various embodiments, the outer mold shells may be sized and dimensioned without consideration of the details of the object to be formed in mold 100 other than general overall dimensions and volume and, instead, may have generic dimensions and a generic shape to facilitate use in forming different objects. In some of the various embodiments, the inner mold bodies may be sized and dimensioned based on the details of the object to be formed in mold 100. In some embodiments, the inner dimensions and the inner shape of the inner mold bodies may define the shape and dimensions of the internal volume 106 and, thereby, may define the shape and dimensions of one or more portions of the object to be formed. In some embodiments, the outer dimensions and the outer shape of the inner mold bodies may correspond to the inner dimensions and the inner shape of the outer mold shells to facilitate coupling the inner mold bodies to the outer mold shells.

In one or more of the various embodiments, a set of the outer mold shells (for example, a set that includes the left outer mold shell 116a and the right outer mold shell 116b) may be formed for each carousel station of an automation machine, such as an automation machine available under the mark DESMA™. In some of the various embodiments, a set of inner mold bodies (for example, a set that includes the left inner mold body 118a and the right inner mold body 118b) may also be formed for each station of the automation machine and coupled to the sets of outer mold shells to facilitate automated manufacturing of one or more portions of a product, such as a shoe. In some embodiments, to facilitate automated manufacturing of a different product, a different model of the product, or a different size of the product, a different set of inner mold bodies (for example, a set that includes a different left inner mold body and a different right inner mold body) may be formed, and the original set of inner mold bodies may be replaced with the different inner mold bodies. Accordingly, in some embodiments, employing the hybrid mold 100 may provide cost savings, without requiring significant human intervention to form the hybrid mold 100, by replacing only a portion of the hybrid mold 100 for each different product, model, or size.

In one or more of the various embodiments, the outer mold shells may be formed of a material, such as aluminum or others, and the inner mold bodies may be formed of a different material, such as nylon, sintered metal, or others. In some of the various embodiments, the outer mold shells may have a structure, such as a solid block or others, and the inner mold bodies may have a different structure, such as a lattice structure or others. In some embodiments, manufacturing structures such as a lattice structure may provide faster manufacturing time than a solid block or may require less material than a solid block. In some embodiments, the outer mold shells may be formed by a process, such as a subtractive manufacturing process (for example, milling with a Computer Numeric Control (CNC) machine or others) or others, and the inner mold bodies may be formed by a different process, such as an additive manufacturing process (for example, 3D printing or others) or others. In some embodiments, the inner mold bodies may be manufactured with a Multi Jet Fusion (MJF) 3D printer available under the mark HEWLETT-PACKARD™ (HP™).

Typically, forming a side ring with a CNC machine requires a 5-axis CNC machine. In one or more of the various embodiments, forming inner mold bodies with an additive manufacturing process may be faster than forming side rings with a subtractive manufacturing process (for example, 2-3 days to manufacture nylon inner mold bodies with an additive process versus several weeks to manufacture solid aluminum side rings with a subtractive process). In some of the various embodiments, unused or excess material at the end of the additive manufacturing process of the inner mold bodies may be recycled and used to manufacture the next inner mold bodies. Accordingly, in some embodiments, employing the hybrid mold 100 may provide one or more of cost or time savings, without requiring significant human intervention to form the hybrid mold 100, by using one or more lower cost materials, structures, or processes, structures that can be manufactured faster, or faster processes for the swappable portions (for example, the inner mold bodies) of the hybrid mold 100 than for the outer mold shells.

In one or more of the various embodiments, one or more portions of the inner mold bodies (for example, one or more portions of the inner mold bodies that defines one or more shapes or dimensions of one or more of an insole, a midsole, an outsole, or others) may be custom generated based on dimensional information, such as two-dimensional (2D) or three-dimensional (3D) information. In some of the various embodiments, dimensional information may be obtained based on object information from a scanner (for example, a 2D scanner or a 3D scanner) that scans an object. In some embodiments, the object information may describe one or more dimensions or shapes of one or more scanned portions of the object. In some embodiments, the object information from the scanner may include a point cloud. In some embodiments, the dimensional information may be generated based on one or more portions of the object information, such as one or more points in the point cloud. In some embodiments, one or more portions of the inner mold bodies may be generated to facilitate manufacturing an object that has one or more portions with one or more shapes or dimensions that match one or more shapes or dimensions of one or more corresponding portions of the scanned object. In other embodiments, one or more portions of the inner mold bodies may be generated to facilitate manufacturing an object that has one or more portions with one or more shapes or dimensions that counteract one or more shapes or dimensions of one or more corresponding portions of the scanned object.

In one or more of the various embodiments, a consumer's foot may be scanned to generate foot information for the consumer's foot, and one or more portions of the inner mold bodies may be generated based on dimensional information that is generated based on the foot information. In some of the various embodiments, the one or more mold bodies may be generated to facilitate manufacturing one or more portions of a shoe that have one or more shapes or dimensions that match one or more shapes or dimensions of one or more corresponding portions of the scanned foot. In some embodiments, the one or more mold bodies may be generated to facilitate manufacturing one or more portions of a shoe that have one or more shapes or dimensions that counteract one or more shapes or dimensions of one or more corresponding portions of the scanned foot. For example, in some embodiments, the one or more mold bodies may be generated to facilitate manufacturing one or more portions of one or more insoles that have one or more shapes or dimensions that change one or more shapes or dimensions of one or more corresponding portions of the consumer's foot when wearing a shoe having the insole, compared to the consumer's foot when outside of the shoe. In other embodiments, one or more portions of one or more inner mold bodies may be generated based on dimensional information for a scanned shoe, a scanned insole, or others.

In one or more of the various embodiments, the hybrid mold 100 may have one or more carrier plates that define a bottom surface of the internal volume 106. In some of the various embodiments, one or more portions of one or more carrier plates may be separable from one or more of the outer mold shells or the inner mold bodies. In some embodiments, one or more portions of one or more carrier plates may be integral to one or more of the outer mold shells or the inner mold bodies. In some embodiments, the hybrid mold may have a single carrier plate that includes a lower carrier portion and an upper carrier portion (see, for example, lower carrier portion 220 and upper carrier portion 222 in FIG. 10). In other embodiments, the hybrid mold may have multiple carrier plates, such as a left carrier plate and a right carrier plate, that each include a lower carrier portion, such as left lower carrier portion 220a and right lower carrier portion 220b (see, for example, FIG. 2), and an upper carrier portion, such as left upper carrier portion 222a and right upper carrier portion 222b (see, for example, FIG. 2).

In one or more of the various embodiments, each lower carrier portion may be sized and dimensioned without consideration of the details of the object to be formed in mold 100 and, instead, may have generic dimensions and a generic shape to facilitate use in forming different objects. In some of the various embodiments, each upper carrier portion may be sized and dimensioned based on the details of the object to be formed in mold 100. In some embodiments, the dimensions and the shape of the upper surface of each upper carrier portion may define the shape and dimensions of the bottom surface of the internal volume 106 and, thereby, may define the shape and dimensions of one or more portions of the object to be formed.

Figure 2:
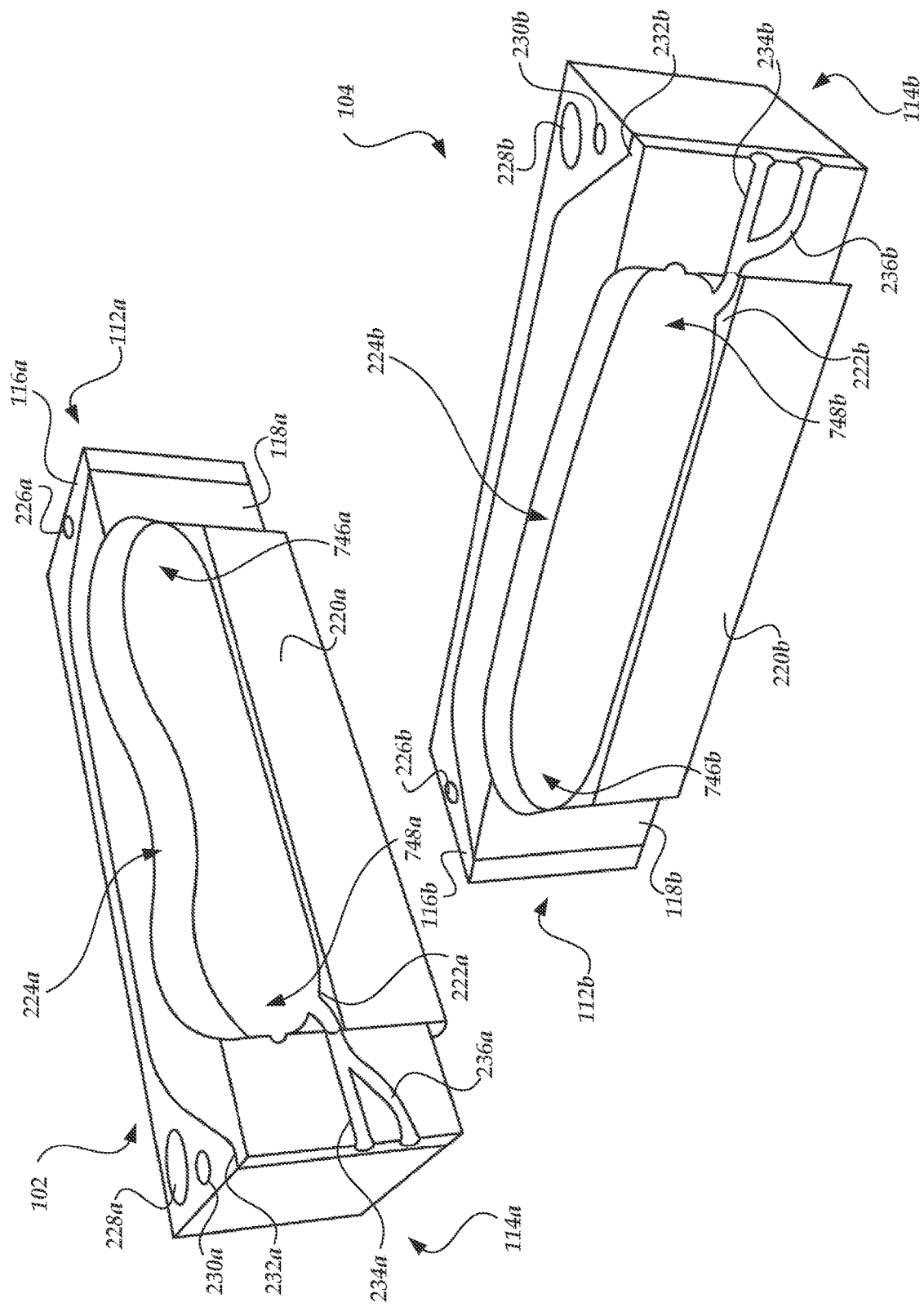
FIG. 2 illustrates a perspective view of an example left hybrid side ring and a separated example right hybrid side ring of the hybrid mold of FIG. 1 in a separated configuration.

FIG. 2 illustrates a perspective view of left hybrid side ring 102 and right hybrid side ring 104 of hybrid mold 100 in a separated configuration. In the example shown in FIG. 2, the upper surface of upper carrier portion 222a defines the bottom surface of left interior volume 224a, and the upper surface of upper carrier portion 222b defines the bottom surface of right interior volume 224b. In some embodiments, when left hybrid side ring 102 and right hybrid side ring 104 are in the joint configuration (for example, as shown in FIG. 1), left internal volume 224a and right internal volume 224b combine to form internal volume 106. In some embodiments, the dimensions and the shape of the bottom surface of each upper carrier portion may correspond to the dimensions and the shape of the upper surface of each lower carrier portion to facilitate coupling each upper carrier portion to a corresponding lower carrier portion.

In one or more of the various embodiments, a lower carrier portion may be formed for each carrier plate of each carousel station of the automation machine. In some of the various embodiments, an upper carrier portion may also be formed for each carrier plate of each station of the automation machine and coupled to a corresponding lower carrier portion to facilitate automated manufacturing of one or more portions of the product. In some embodiments, to facilitate automated manufacturing of a different product, a different model of the product, or a different size of the product, a different upper carrier portion may be formed, and the original upper carrier portion may be replaced with the different carrier portion. Accordingly, in some embodiments, employing the hybrid mold 100 may provide cost savings, without requiring significant human intervention to form the hybrid mold 100, by replacing only a portion of each carrier plate for each different product, model, or size.

In one or more of the various embodiments, the lower carrier portions may be formed of a material, such as aluminum or others, and the upper carrier portions may be formed of a different material, such as nylon, sintered metal, or others. In some of the various embodiments, each lower carrier portion may have a structure, such as a solid block or others, and each upper carrier portion may have a different structure, such as a lattice structure or others. In some embodiments, the lower carrier portions may be formed by a process, such as a subtractive manufacturing process (for example, milling with a CNC machine or others) or others, and the upper carrier portions may be formed by a different process, such as an additive manufacturing process (for example, 3D printing or others) or others. Accordingly, in some embodiments, employing the hybrid mold 100 may provide cost savings, without requiring significant human intervention to form the hybrid mold 100, by using one or more lower cost materials, structures, or processes for the swappable portions (for example, each upper carrier portion) of the hybrid mold 100 than for each lower carrier portion.

In one or more of the various embodiments, hybrid side ring may have one or more coupling holes, such as one or more of left front coupling hole 226a, right front coupling hole 226b, left rear coupling hole 228a, right rear coupling hole 228b, left rear coupling hole 230a, or right rear coupling hole 230b, that are sized and dimensioned to receive one or more coupling mechanisms (for example, one or more bolts or others) to facilitate coupling each hybrid side ring to a station of the automation machine.

In one or more of the various embodiments, one or more inner mold bodies may have one or more extension portion, such as left extension portion 232*a* and right extension portion 232*b*, that extend to an outer edge of hybrid mold 100. In some of the various embodiments, one or more portions of each injection port (for example, upper injection port 108 or lower injection port 110) may extend through the one or more extension portions, from the outer edge of hybrid mold 100 to internal volume 106. Accordingly, in some embodiments, each extension portion facilitates providing a different injection path for each different inner mold body while using the same outer mold shells. In the example of FIG. 2, left extension portion 232*a* has left upper injection port portion 234*a* and left lower injection port portion 236*a*, and right extension portion 232*b* has right upper injection port portion 234*b* and right lower injection port portion 238*b*. In some embodiments, left upper injection port portion 234*a* and right upper injection port portion 234*a* may combine, when left hybrid side ring 102 and right hybrid side ring 104 are in the joint configuration (for example, as shown in FIG. 1), to form upper injection port 108. In some embodiments, left lower injection port portion 236*a* and right lower injection port portion 236*a* may combine, when left hybrid side ring 102 and right hybrid side ring 104 are in the joint configuration (for example, as shown in FIG. 1), to form lower injection port 110. In other embodiments, only one inner mold body has an extension portion, or each injection port is formed in an extension portion of only one inner mold body.

In one or more of the various embodiments, one or more upper injection port portions, lower injection port portions, or combined injection port portions extend through one or more portions of one or more upper carrier portions to internal volume 106. In other embodiments, one or more upper injection port portions, lower injection port portions, or combined injection port portions do not extend through an upper carrier portion. In some examples of those other embodiments, the one or more injection port portions are instead positioned above the maximum upper position of the upper carrier portion, thereby extending directly from one or more extension portions to internal volume 106. In some examples of those other embodiments, the upper carrier portion is lowered below the lowest of the one or more injection port portions prior to injection (see, for example, FIG. 13) and subsequently raised after completion of the injection to bring the injected midsole material into contact with the upper (see, for example, FIG. 14). In some examples, the carrier blocks one or more injection port portions when in the raised configuration (see, for example, FIG. 14).

Figure 3:
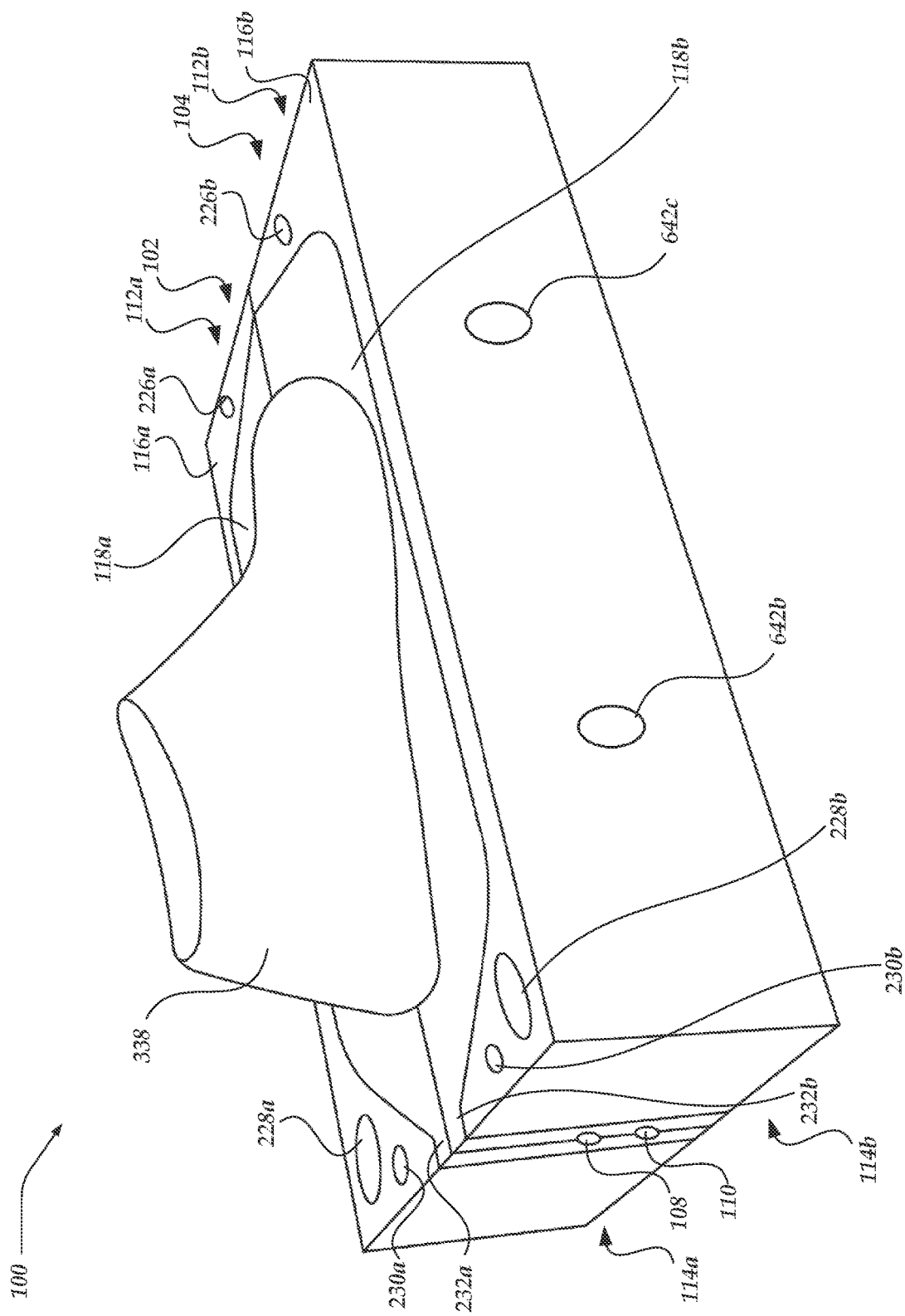
FIG. 3 shows a perspective view of the hybrid mold of FIG. 1, with the hybrid side rings in the joint configuration and an example upper positioned in the internal volume of the hybrid mold.
Figure 4:
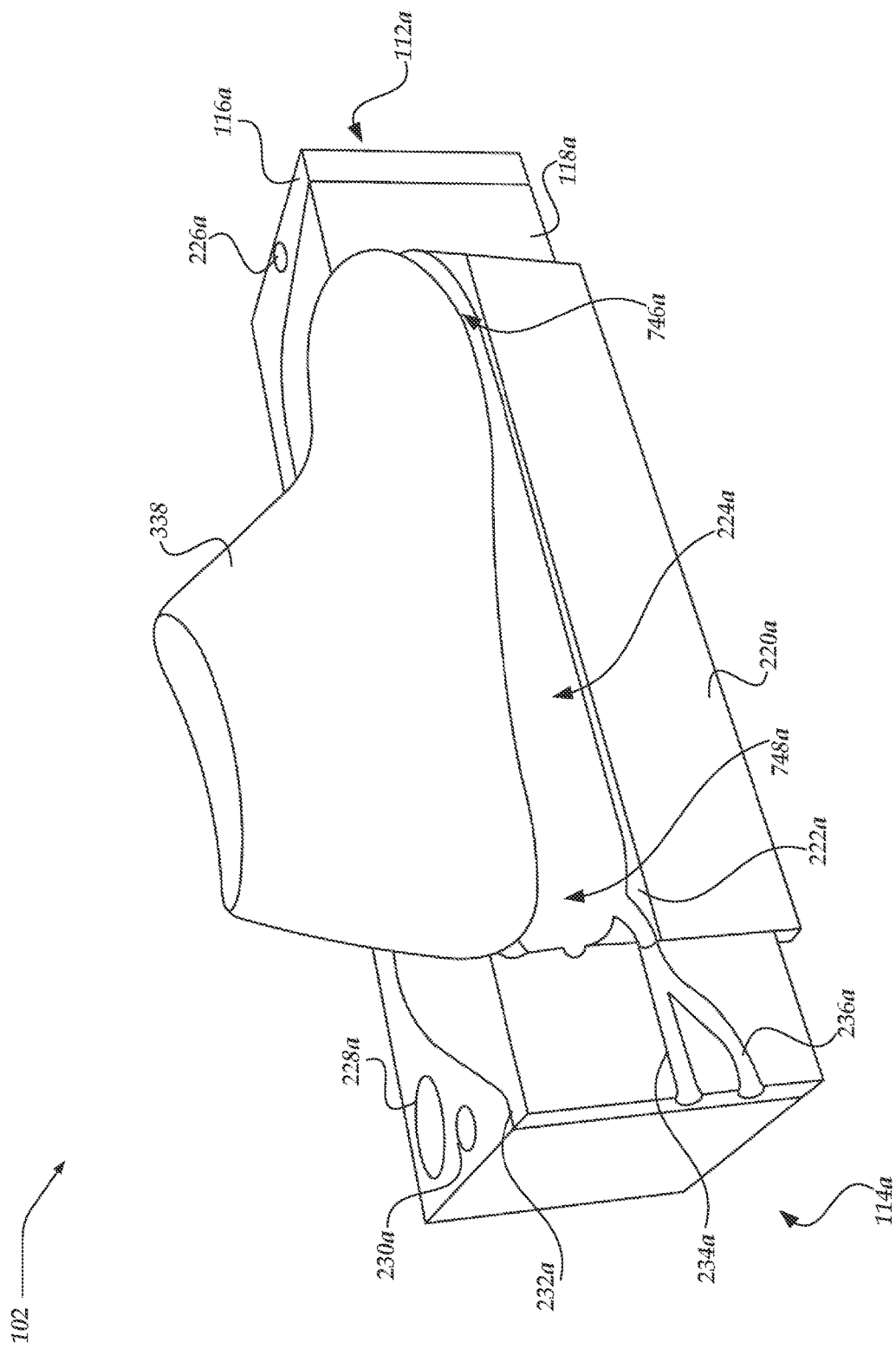
FIG. 4 illustrates a perspective view of the upper positioned in the internal volume defined by the hybrid mold of FIG. 1, with the right hybrid side ring removed.

FIG. 3 shows a perspective view of hybrid mold 100, with left hybrid side ring 102 and right hybrid side ring 104 in the joint configuration and example upper 338 positioned in internal volume 106. In one or more of the various embodiments, upper 338 may be disposed on a last (for example, a last formed with an additive manufacturing process, such as 3D printing or others) that is coupled to a station in which hybrid mold 100 is installed. In some of the various embodiments, while the hybrid side rings are in the separated configuration, upper 338 may be lowered by the automation machine to a position between the hybrid side rings, and the hybrid side rings may be transitioned to the joint configuration to form internal volume 106 with at least a lower portion of upper disposed in internal volume 106. In some embodiments, one or more of an outsole (for example, outsole 644 shown in FIG. 6 or 15-20) or a Strobel board may be positioned on an upper surface of a carrying plate of hybrid mold 100 prior to lowering upper 338. In other embodiments, the outsole may be formed in internal volume 106 after lowering upper 338 and transitioning the hybrid side rings to the joint configuration. FIG. 4 illustrates a perspective view of upper 338 positioned in internal volume 224*a* defined by left hybrid side ring 102, with right hybrid side ring 104 removed to show internal volume 224*a* prior to injection of fluid that forms one or more portions of the midsole or the outsole.

Figure 5:
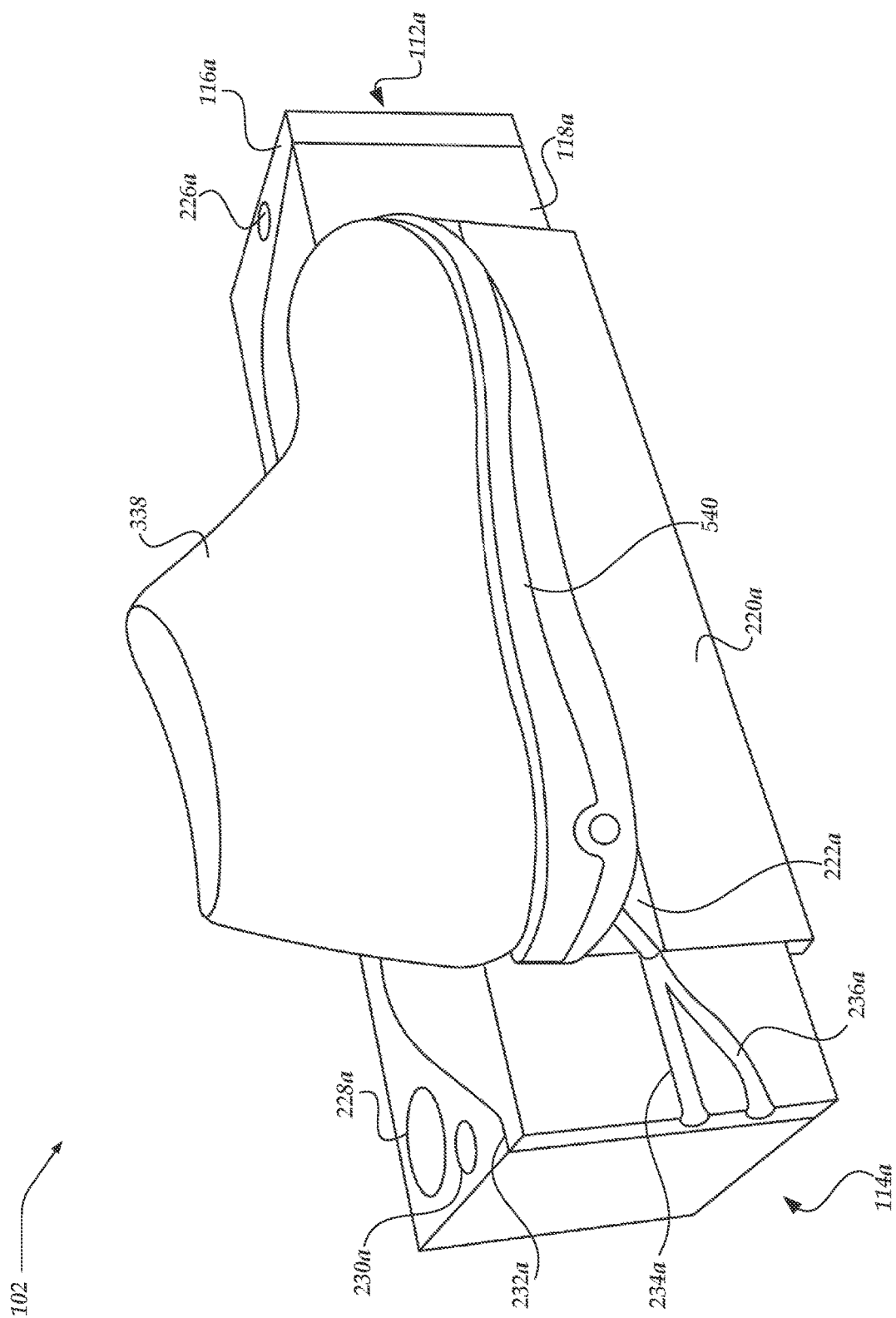
FIG. 5 shows a perspective view of an example injected midsole in the internal volume defined by the hybrid mold of FIG. 1, with the right hybrid side ring removed.
Figure 13:
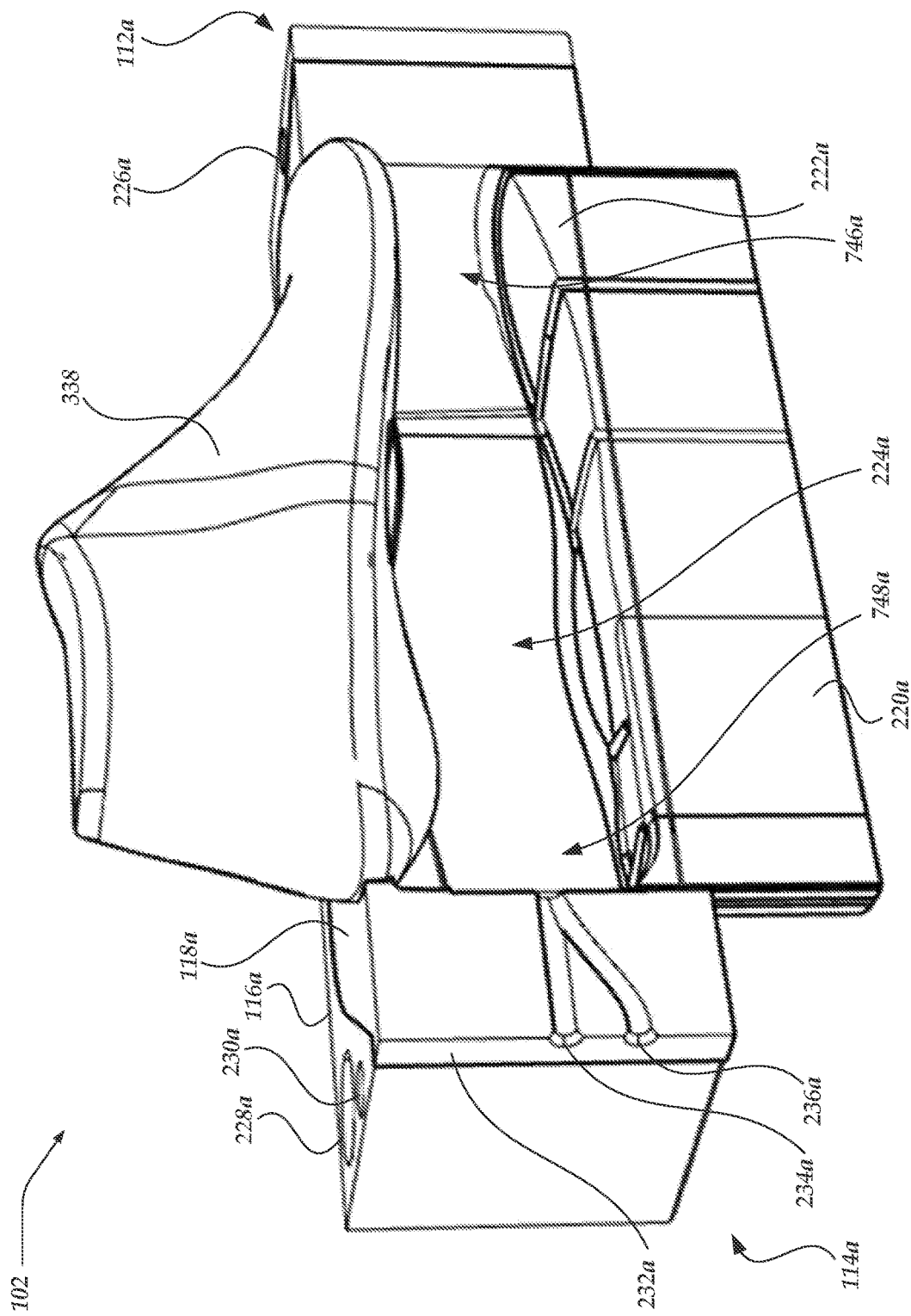
FIG. 13 shows a perspective view of the upper positioned in the internal volume defined by the hybrid mold of FIG. 1, with the right hybrid side ring removed.
Figure 14:
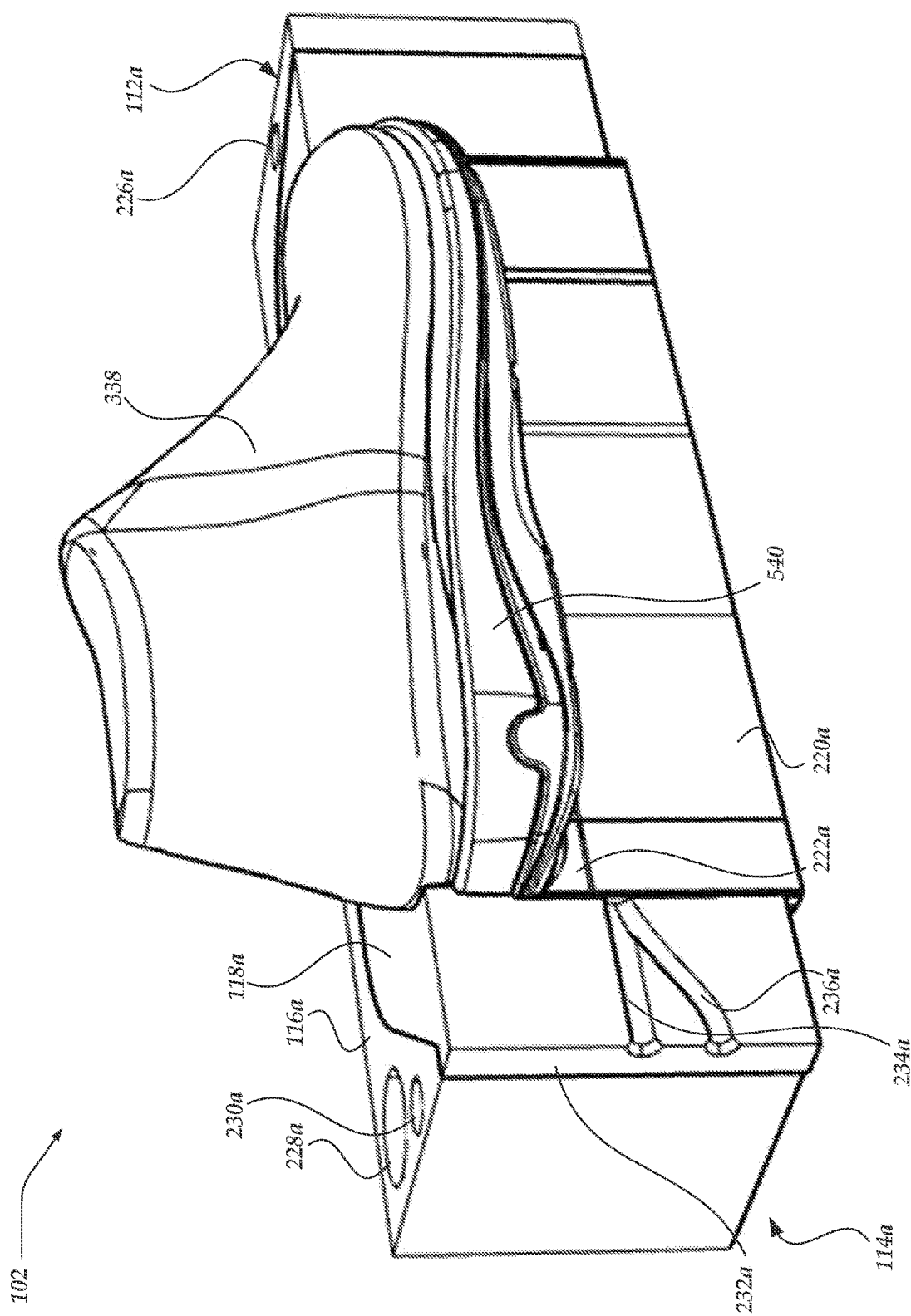
FIG. 14 illustrates a perspective view of the injected midsole in the internal volume defined by the hybrid mold of FIG. 1, with the right hybrid side ring removed.

In one or more of the various embodiments, with the hybrid side rings in the joint configuration and upper 338 in internal volume 106 (see FIG. 3), the automation machine may inject one or more fluids into internal volume 106 through one or more injection ports. In some of the various embodiments, the injected fluid may fill internal volume 106 up to at least a bottom edge of upper 338 to form one or more of a midsole or an outsole that couples to upper 338. In other embodiments, the injected fluid may partially fill internal volume 106, and, after completion of the injection, the carrier is raised to bring the injected fluid into contact with at least a bottom edge of upper 338 to form the one or more of the midsole or the outsole that couples to upper 338 (see, for example, FIGS. 13 and 14). FIGS. 5 and 14 show perspective views of example injected midsole 540 in internal volume 106 defined by hybrid mold 100, with right hybrid side ring 104 removed to show injected midsole 540. In some embodiments, injected midsole 540 may mechanically or chemically bond to upper 338.

Figure 6:
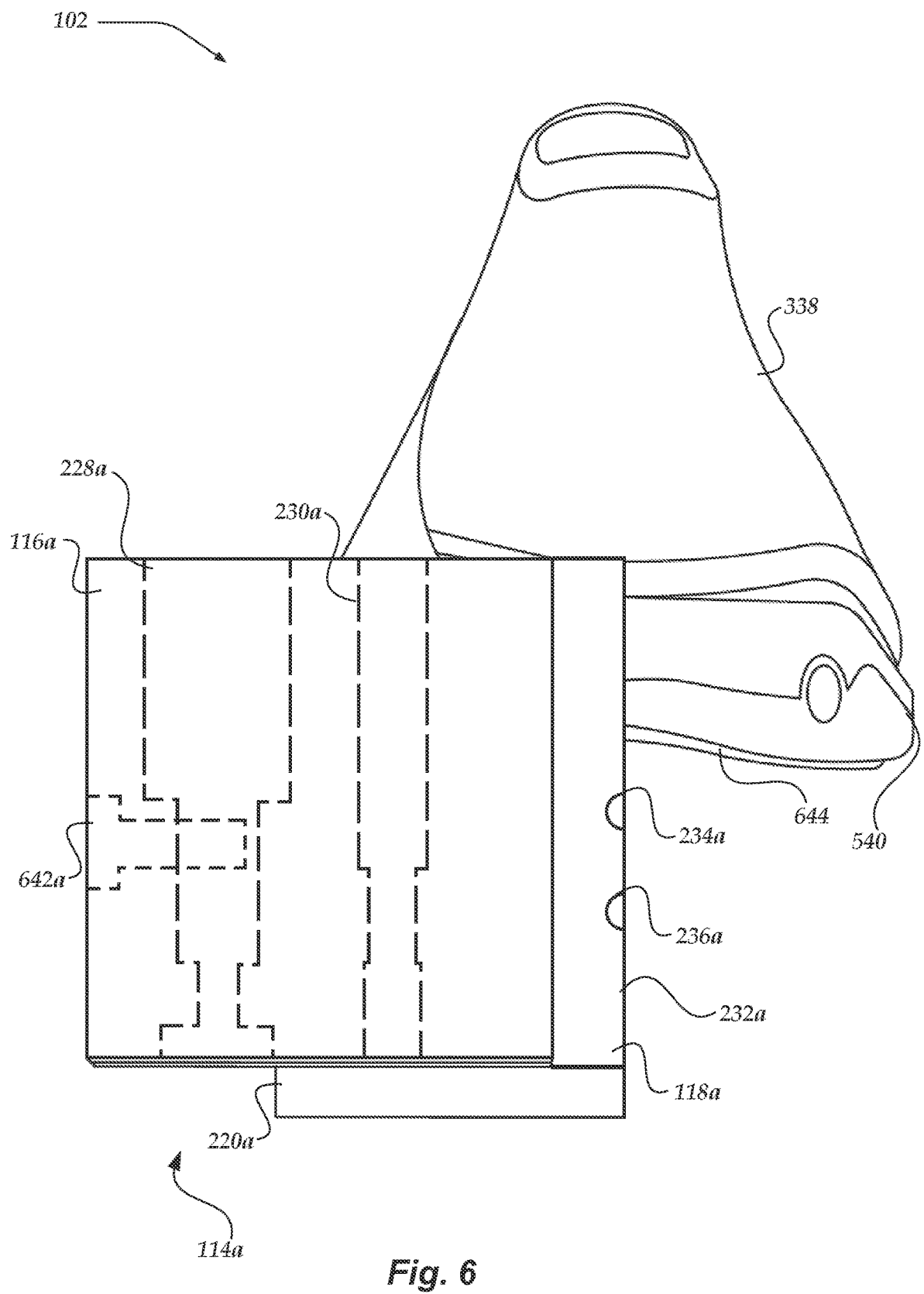
FIG. 6 illustrates a rear view of the left hybrid side ring of the hybrid mold of FIG. 1, with hidden lines showing example coupling holes.

FIG. 6 illustrates a rear view of left hybrid side ring 102, with several example features shown with hidden lines. In one or more of the various embodiments, one or more coupling holes, such as left rear coupling hole 228*a* and left rear coupling hole 230*a*, may extend through the entire vertical height of left outer mold shell 116*a* to facilitate separably coupling left outer mold shell 116*a* to an upper surface of a station of the automation machine on which hybrid mold 100 is disposed. In some of the various embodiments, one or more coupling holes may have one or more counterbores or countersinks to facilitate receiving a fastener (for example, a bolt or others) with the upper surface of the fastener being disposed below the upper surface of the outer mold shell.

In one or more of the various embodiments, each hybrid side ring may have one or more lateral or longitudinal coupling holes, such as left rear lateral coupling hole 642*a*, right rear lateral coupling hole 642*b* (see FIG. 1), and right front lateral coupling hole 642*c* (see FIG. 1). In some of the various embodiments, each lateral or longitudinal coupling hole may extend through an outer mold shell and at least partially into a corresponding inner mold body to facilitate receiving a fastener (for example, a bolt, locator pin, or others) that may separably couple the inner mold body to the outer mold shell and that may facilitate precise alignment of the inner mold bodies with the outer mold shells. In some embodiments, one or more lateral or longitudinal coupling holes may have one or more counterbores or countersinks to facilitate receiving the fastener (for example, a bolt or others) with the upper surface of the fastener being disposed internal to the outer surface of the outer mold shell. In some embodiments, one or more inner surfaces of one or more outer mold shells may have one or more recessed or protruding features that correspond to one or more oppositely protruding or recessed features in one or more outer surfaces of one or more inner mold bodies to facilitate indexing the one or more inner mold bodies to the one or more outer mold shells, with or without indexing pins. In some embodiments, one or more inner mold bodies may couple to one or more outer mold shells with fasteners (for example, bolts, clips, clamps, or others), Snap-fit, interference fit, or others.

Figure 7:
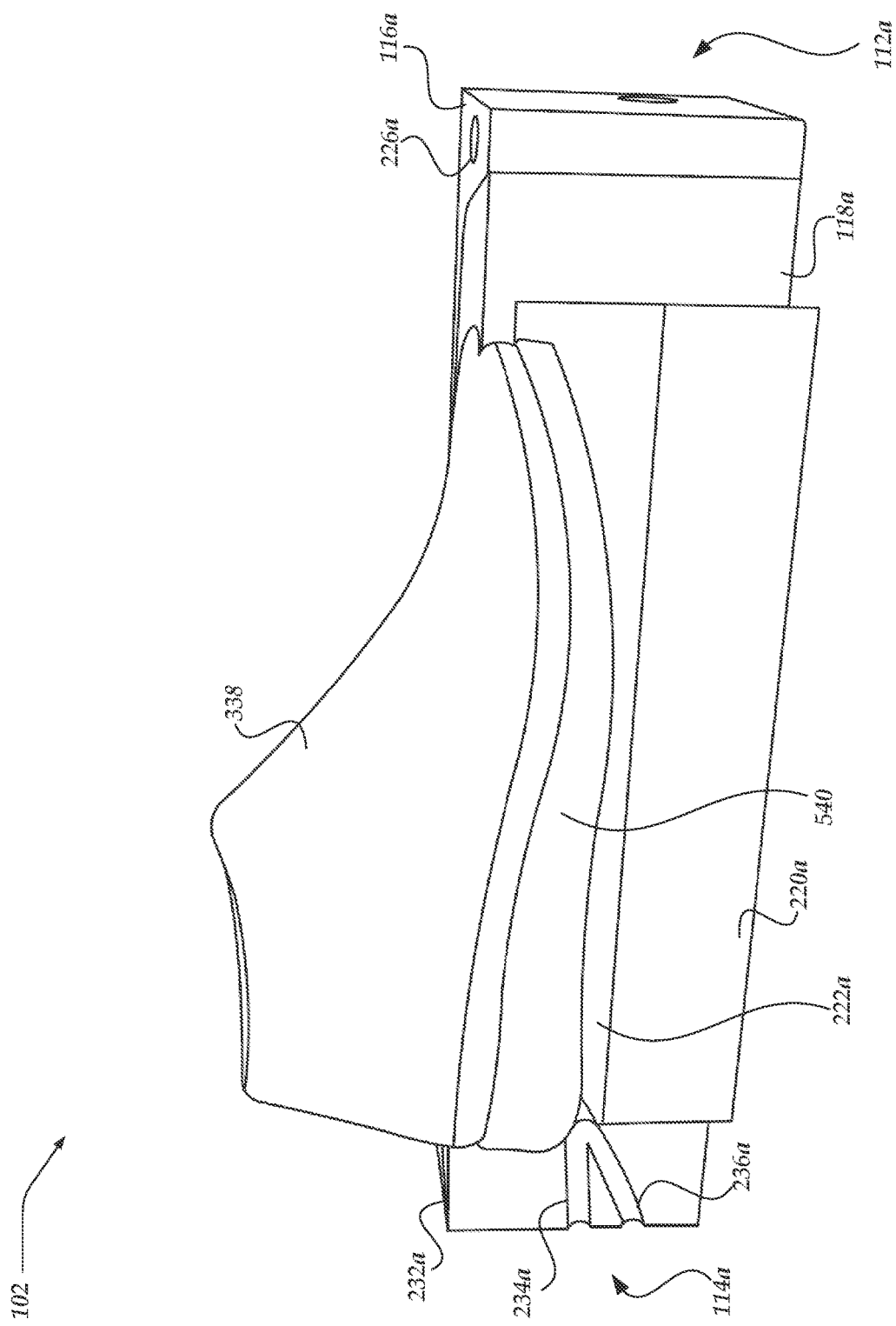
FIG. 7 shows a perspective view of the left hybrid side ring of the hybrid mold of FIG. 1.

FIG. 7 shows a side perspective view of left hybrid side ring 102. In one or more of the various embodiments, each hybrid side ring may have a toe end portion of internal volume 106 and a heel end portion of internal volume 106, such as left toe end portion 746a, right toe end portion 746b (see FIG. 1), left heel end portion 748a, and right heel end portion 748b. In some of the various embodiments, to provide toe spring in injected midsole 540 or outsole 644, especially in running shoes, the bottom surface of the toe end portion of internal volume 106 may be elevated above the bottom surface of the heel end portion of internal volume 106. In some embodiments, when the fluid that forms midsole 540 is injected into internal volume 106, a higher injection pressure may be initially employed to force the fluid into the toe end portion, and the pressure may be then reduced to facilitate the injected fluid filling the heel end portion. In other embodiments, the same or substantially the same (for example, pressure variance of 1%, 5%, 10%, or less) pressure may be used throughout the injection process, with fluid first being injected into the toe end portion and subsequently injected fluid stopping at sequentially rearward positions due to contact with already injected material. In some embodiments, a hardener or other material may be injected during a first time period, and a different hardener or other material may be injected during a subsequent time period to provide multiple zones in the midsole (see FIGS. 18-20). Accordingly, it may be challenging to create the multiple zones as intended when the fluid in the toe end portion begins to flow back toward the heel end portion under the force of gravity (see FIGS. 18-20 at top). In some embodiments, extra fluid may be injected into the toe end portion to compensate for the flow of the fluid toward the heel end portion.

Figure 8:
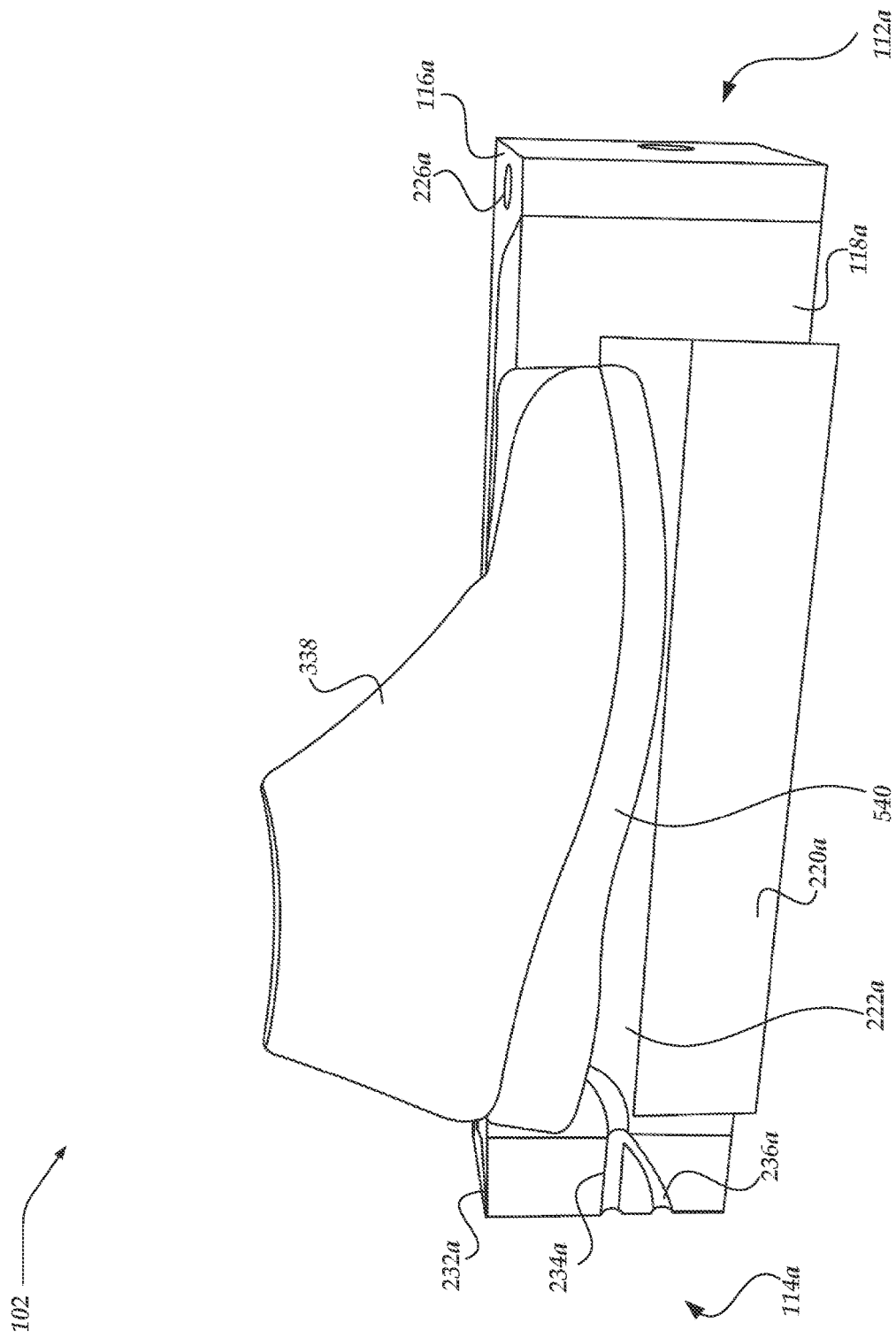
FIG. 8 illustrates a perspective view of the left hybrid side ring of the hybrid mold of FIG. 1, with an example modified orientation of the internal volume defined by the hybrid mold.

FIG. 8 illustrates a side view of left hybrid side ring 102, with an example modified orientation of internal volume 106 defined by hybrid mold 100. In one or more of the various embodiments, the modified orientation may provide the toe end portion at a lower elevation than the heel end portion, at the same elevation as the heel end portion, or at a slightly higher elevation than the heel end portion with the heel end portion being elevated above one or more other portions of internal volume 106. In some of the various embodiments, the bottom surface of internal volume may be tipped downward at the toe end portion by 2.5, 5, 7.5, 10, 12.5, 15, or more degrees relative to the orientation of the manufactured shoe when resting with the bottom of the midsole (or the bottom of the outsole) on a horizontal surface. In some embodiments, the modified orientation of internal volume 106 reduces the amount of fluid that flows away from its intended location, such as the toe end portion, under the force of gravity. In some embodiments, the modified orientation facilitates reducing the amount of fluid injected into internal volume 106 to form a midsole of a given volume and a given degree of toe spring. In some embodiments, the modified orientation of internal volume 106 facilitates increasing the ease of controlling fill and generation of different material zones.

In one or more of the various embodiments, the orientation of an entirety of hybrid mold 100, including the outer mold shell, the inner mold body, and each carrier plate, may be modified. In other embodiments, the orientation of one or more portions of hybrid mold 100, such as inner mold body and each carrier plate, may be modified relative to the orientation of the upper surface of the outer mold shell. In some embodiments, the orientation of the surfaces that define internal volume 106 may be changed, and the upper surfaces of the outer mold shells and the inner mold bodies may remain horizontal. In some embodiments, in the non-modified orientation, the vertical distance between the upper surface of the inner mold body and the upper surface of each lower carrier portion, such as left lower carrier portion 220a and right lower carrier portion 220b, may be 50, 75, 100, 125, 150, 175, 200, 225, 250, 275, 300 millimeters or more. In some embodiments, in the non-modified orientation, the height of the manufactured midsole may be 20, 25, 30, 25, 40, 45, or more millimeters. Accordingly, in some embodiments, the orientation of the internal volume 106 may be modified without adjusting the size of the inner mold body.

Figure 9:
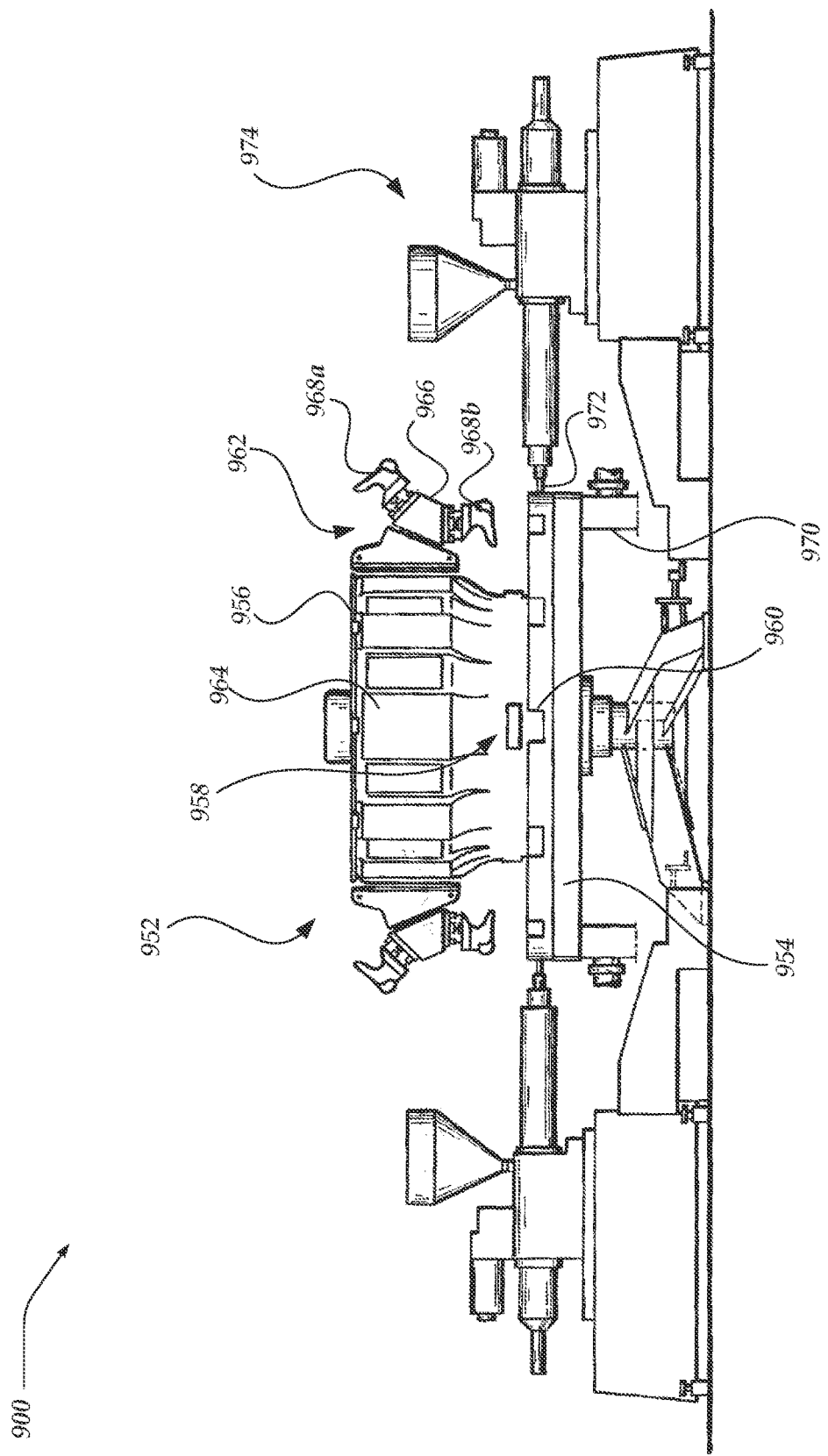
FIG. 9 shows a side-elevational view of an example automation machine that employs the hybrid mold of FIG. 1.

FIG. 9 shows a view of example automation machine 900 that employs hybrid mold 100. In one or more of the various embodiments, automation machine 900 may have a carrousel, such as carrousel 952. In some of the various embodiments, carrousel 952 may have table 954 and upper portion 956. In some embodiments, carrousel 952 may have multiple stations, such as station 958. In some embodiments, each station may include a portion of table 954 and a portion of upper portion 956. In some embodiments, each station may have a recess in table 954, such as recess 960, and a last mechanism, such as last mechanism 962. In some embodiments, each last mechanism may be coupled to an upper platform in upper portion 956, such as upper platform 964, disposed above a recess of a corresponding station. In some embodiments, each last mechanism has a rotatable body, such as rotatable body 966, that is coupled to one or more lasts, such as last 968a or last 968b, to rotatably select a last to employ at a given stage. In some embodiments, each station may have a carrier piston, such as carrier piston 970, that raises or lowers one or more carrier plates of the hybrid mold associated with the station.

In one or more of the various embodiments, each carrier piston may raise or lower one or more carrier plates along an axis that is transverse (for example, perpendicular) to a plane that may support the shoe in the same orientation as internal volume 106. In some of the various embodiments, the axis along which each carrier piston raises or lowers one or more carrier plates may be modified by the same number of degrees that the orientation of internal volume 106 is modified. In some examples, using the orientation of internal volume 106 as shown in FIG. 7, a shoe manufactured with hybrid mold 100 may have the same orientation as internal volume 106 when the bottom of the midsole (or the outsole) rests on a horizontal surface (for example, 0° offset). Accordingly, in these examples, a carrier piston, such as carrier piston 970, may raise or lower one or more carrier plates in a vertical direction (for example, 0° offset). In other examples, using the orientation of internal volume 106 as shown in FIG. 8, a shoe manufactured with hybrid mold 100 may have the same orientation as internal volume 106 when the bottom of the midsole (or the outsole) rests on a flat surface that is, for example, 10° lower at the toe end portion than the horizontal surface. Accordingly, in these examples, a carrier piston, such as carrier piston 970, may raise or lower one or more carrier plates in a direction that is offset from vertical by, for example, 10° toward the toe end portion. In other embodiments, the orientation of the upper surface of each carrier plate may be modified, and a carrier piston, such as carrier piston 970, may raise and lower one or more carrier plates in the vertical direction.

In one or more of the various embodiments, a hybrid mold, such as hybrid mold 100, may be coupled to carrousel 952. In some of the various embodiments, each hybrid side ring of the hybrid mold, such as left hybrid side ring 102 and right hybrid side ring 104, may be coupled to one or more actuators disposed in opposite sides of a recess in table 954, such as recess 960. In some embodiments, the actuators may be configured and arranged to move the hybrid side rings toward and away from each other to transition the hybrid mold between the separated configuration and the joint configuration.

In one or more of the various embodiments, as carrousel 952 revolves, each station transitions from one stage to the next. In some of the various embodiments, in the first stage, hybrid mold 100 may be disposed in the separated configuration. In some embodiments, a carrier plate of hybrid mold 100 may be moved to a lowered position by a carrier piston of the station associated with hybrid mold 100. In some embodiments, an outsole may be placed on a carrier plate of hybrid mold 100. In some embodiments, a Strobel board may be placed on the outsole. In other embodiments, the outsole is formed in internal volume 106 before the midsole is formed (for example, double injection). In some embodiments, the outsole may be formed by lowering a mold (for example, a thermoplastic polyurethane (TPU) mold or others) toward a top surface of the carrier plate after covering the carrier plate with a liquid that cures to form the outsole. In some embodiments, the outsole is formed in internal volume 106 with the midsole at a later stage (for example, single injection).

In one or more of the various embodiments, while hybrid mold 100 is in the separated configuration, a last mechanism at the station of hybrid mold 100 may lower an upper that is wrapped around a last into the space between left hybrid side ring 102 and right hybrid side ring 104. In some of the various embodiments, while the upper is positioned in the recess of the station associated with hybrid mold 100, the actuators may transition left hybrid side ring 102 and right hybrid side ring 104 to the joint configuration.

In one or more of the various embodiments, when the station associated with hybrid mold 100 reaches the stage or cell associated with an injector, a nozzle, such as nozzle 972 of injector 974, may extend to and fluidly couple to one or more injection ports of hybrid mold 100, such as one or more of upper injection port 108 or lower injection port 110. In some of the various embodiments, one or more fluids may be injected from nozzle 972 into internal volume 106 of hybrid mold 100 through one or more injection ports of hybrid mold 100 to form one or more of midsole 540 or outsole 644. In some embodiments, multiple different fluids, such as isocyanate and polyol, may be mixed in an injector head of injector 972 before reaching nozzle 972. In other embodiments, the multiple fluids may be mixed in a common path that may be positioned in the inner mold body of hybrid mold 100 and that may be shared by upper injection port 108 and lower injection port 110. In some embodiments, the head of injector 972 may be heated. In some embodiments, one or more portions of hybrid mold 100 or internal volume 106 may be heated (for example, heated up to 150° F.) to promote catalyzing the injected fluid. In some embodiments, the fluid injected into internal volume 106 foams and cures to form a solid.

In one or more of the various embodiments, as the injected fluid foams and cures, the carrier piston raises one or more carrier plates of hybrid mold 100 to bring the fluid into contact with the upper before the fluid forms a solid. In some of the various embodiments, hybrid mold 100 may remain in the joint configuration until the midsole cures (for example, a predetermined number of turns around carrousel 952, a predetermined number of position changes, a predetermined number of minutes such as six minutes, or others). In some embodiments, after the injected fluid forms a solid midsole or outsole that may be one or more of mechanically or chemically bonded to the upper, the actuators may transition left hybrid mold ring 102 and right hybrid mold ring 104 to the separated configuration. In some embodiments, the last may be lifted out of the recess of the station associated with hybrid mold 100, with the midsole and outsole coupled to the upper that is wrapped around the last.

In one or more of the various embodiments, one or more of the inner mold body or the outer mold shell of hybrid mold 100 may have one or more venting holes (not shown) that facilitate flashing to promote a complete fill during the injection stage, such as one or more venting holes disposed at the toe end portion of the inner mold bodies, the injection ports, or others. In some of the various embodiments, a vacuum may be generated external to the inner mold bodies to promote flashing through the one or more venting holes. In some embodiments, after the upper is lifted out of the recess, the flashing may be manually or automatically trimmed based on the predetermined locations of the one or more vent holes. In some embodiments, one or more of the midsole or the outsole may be formed with one or more injected fluids that cure to form polyurethane (PU) solids, ethylene-vinyl acetate (EVA), or others. In some embodiments, the mold may be one or more of blasted with air or sprayed with mold release prior to lifting the last out of the recess of the station associated with hybrid mold 100. In some embodiments, each station may be involved in parallel processes to manufacture multiple shoes at once (for example, phase offsets between different stations).

Figure 10:
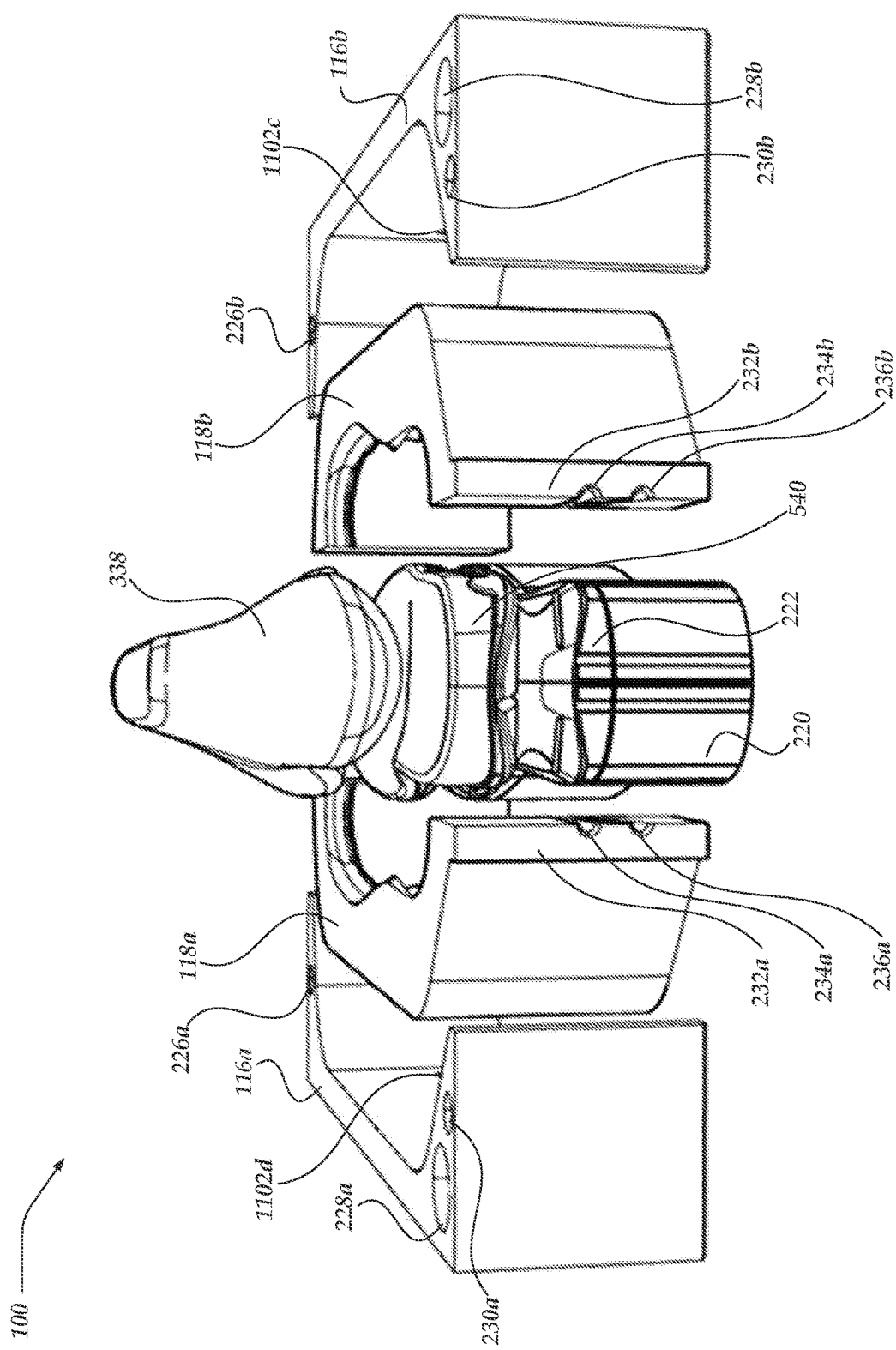
FIG. 10 illustrates an exploded rear perspective view of the hybrid mold of FIG. 1, the example upper, and the example injected midsole.
Figure 11:
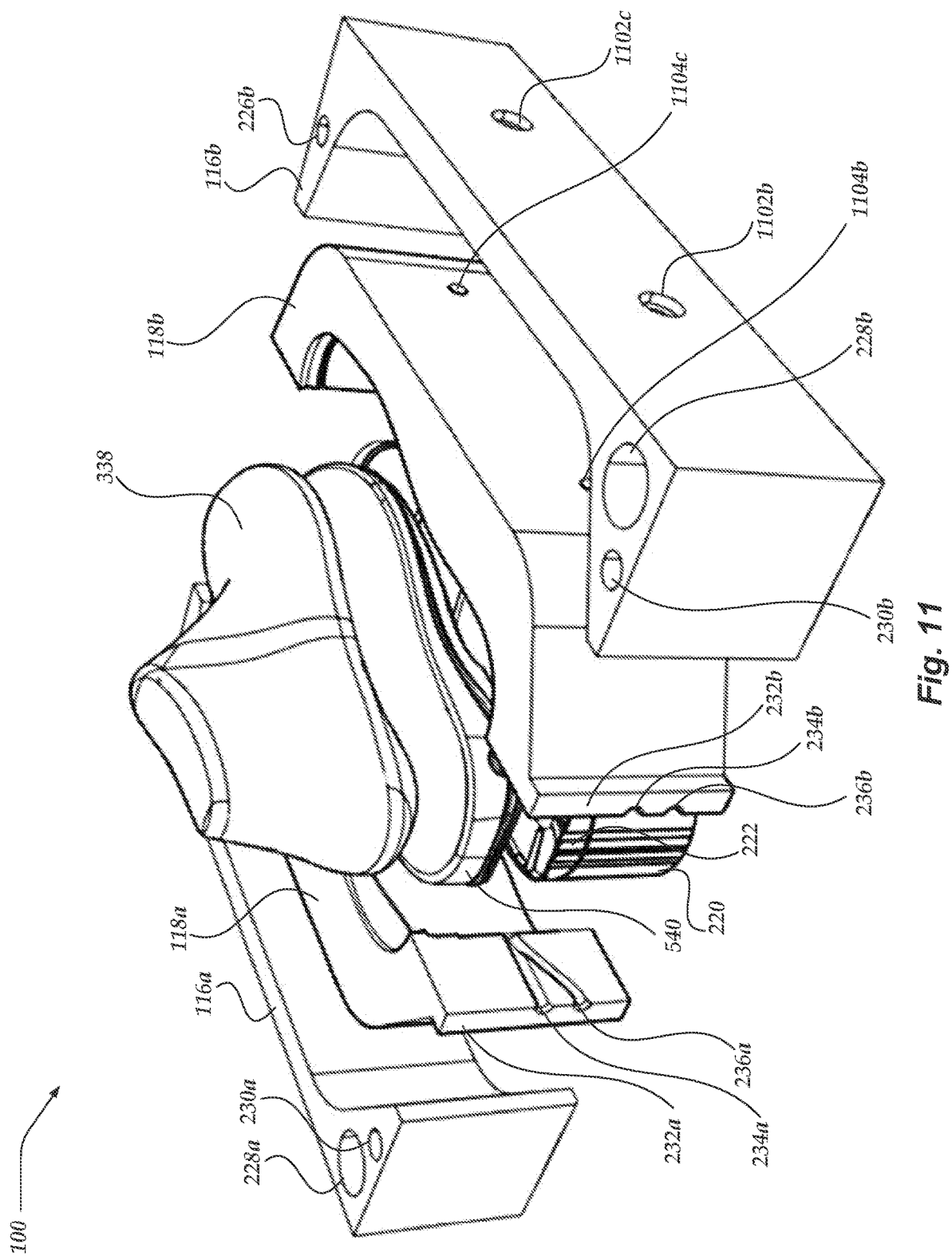
FIG. 11 shows an exploded perspective view of the hybrid mold of FIG. 1, the example upper, and the example injected midsole.

FIG. 10 illustrates an exploded rear perspective view of hybrid mold 100 to emphasize that, in some embodiments, the inner mold bodies can be removed from the outer mold shells and replaced with different inner mold bodies. FIG. 11 shows an exploded perspective view of hybrid mold 100 to emphasize that, in some embodiments, lateral coupling holes 642a, 642b, and 642c may extend through the outer mold shells and at least partially into the inner mold bodies. In one or more of the various embodiments, one or more of the outer mold shells may have one or more outer lateral coupling holes, such as left rear outer lateral coupling hole 1102a (see FIG. 12), right rear outer lateral coupling hole 1102b, right front outer lateral coupling hole 1102c, or left front outer lateral coupling hole 1102d (see FIG. 10). In some of the various embodiments, one or more of the inner mold bodies may have one or more inner lateral coupling holes, such as right rear inner lateral coupling hole 1104b, right front inner lateral coupling hole 1104c, or left front inner lateral coupling hole (not shown). In some embodiments, when one or more inner mold bodies are removably coupled to one or more outer mold shells, the one or more inner lateral coupling holes may align with the one or more outer lateral coupling holes to form one or more lateral coupling holes, such as one or more of lateral coupling holes 642a, 642b, or 642c. Fasteners may be secured through the corresponding coupling holes.

Figure 12:
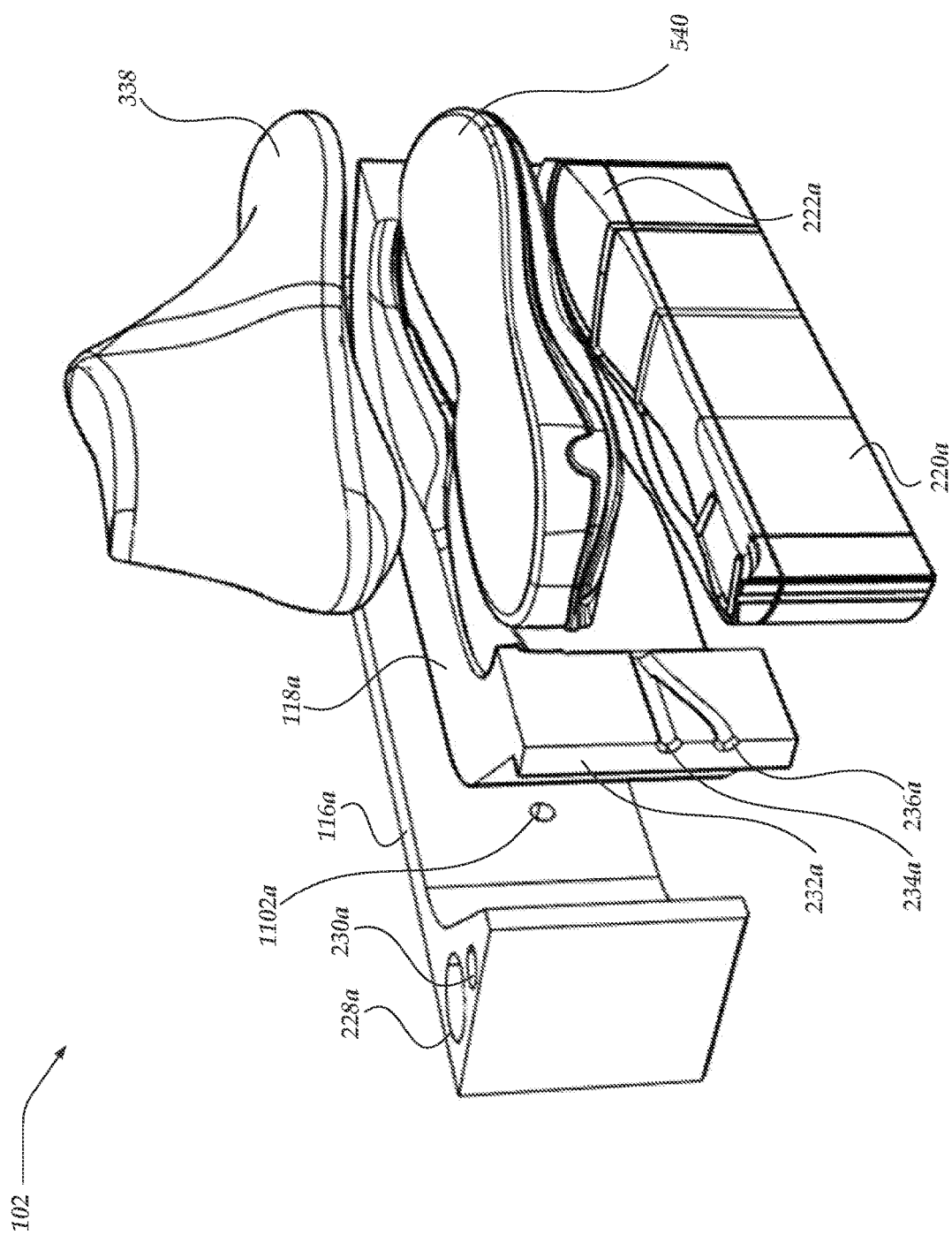
FIG. 12 illustrates an exploded perspective view of the left hybrid side ring of the hybrid mold of FIG. 1, the upper, and the injected midsole.

FIG. 12 illustrates an exploded perspective view of left hybrid side ring 102 of hybrid mold 100 to emphasize that, in some embodiments, one or more injection ports may not extend through the one or more carrier plates of hybrid mold 100. FIG. 13 shows a perspective view of upper 338 positioned in left internal volume 224a of hybrid mold 100 with the carrier plate in a lowered configuration, positioned below the injection port portions, prior to injection of the midsole material in some of the various embodiments. FIG. 14 illustrates a perspective view of injected midsole 540 in the left internal volume of hybrid mold 100 to emphasize that, in some embodiments, after the midsole material is injected into the internal volume, the carrier plate may be raised from the lowered configuration (see FIG. 13) into a raised configuration where the injected midsole material contacts one or more portions of upper 338 and may be left in the raised configuration to facilitate the injected midsole material curing while in contact with the one or more portions of upper 338. In one or more of the various embodiments, one or more of the examples of FIGS. 10-14 may be implemented with a modified orientation, such as the modified orientation as shown and described regarding FIG. 8.

Figure 15:
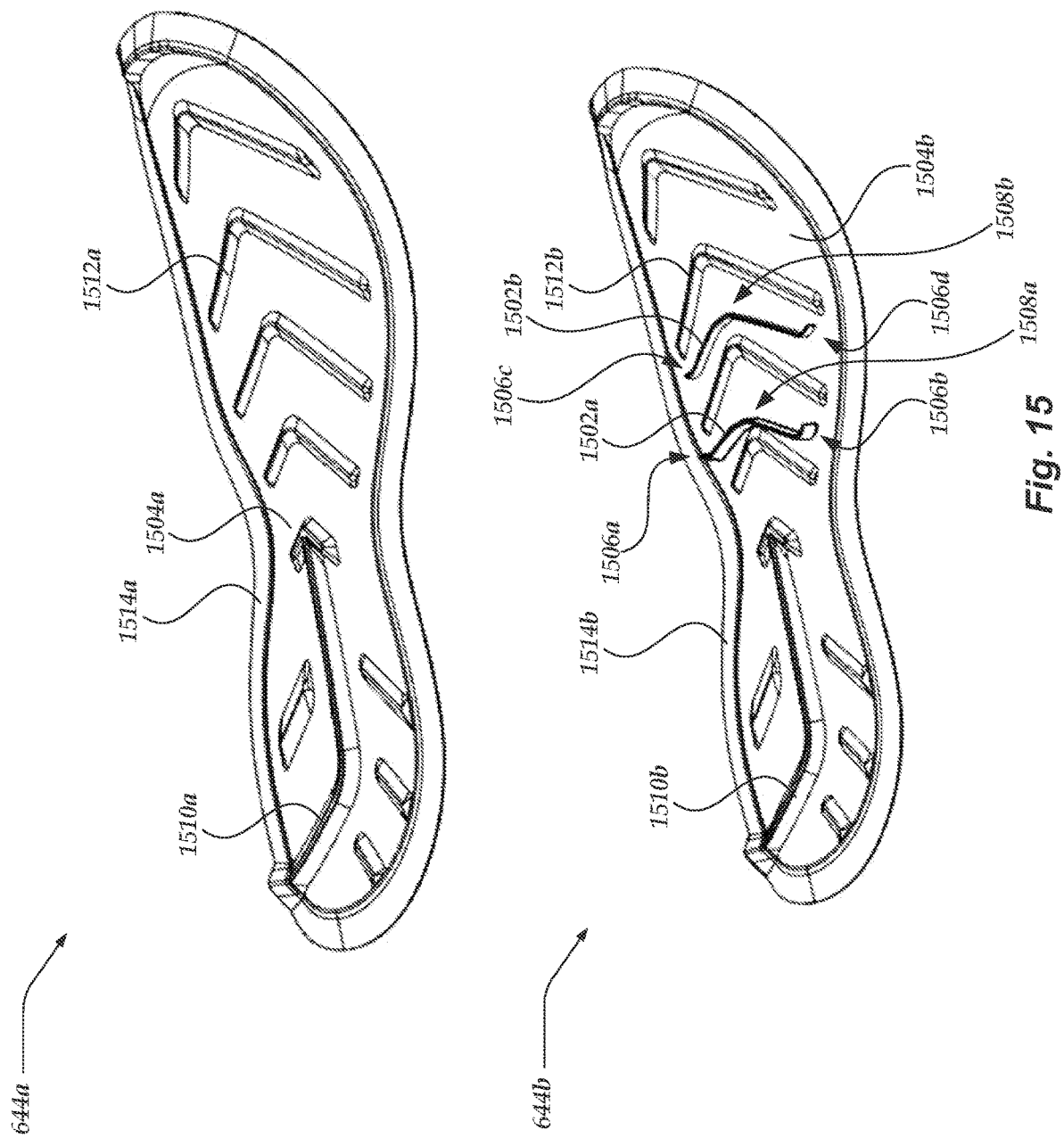
FIG. 15 shows perspective views of an example raw outsole without injection dams and an example raw outsole with example injection dams, both prior to injecting the midsole.
Figure 16:
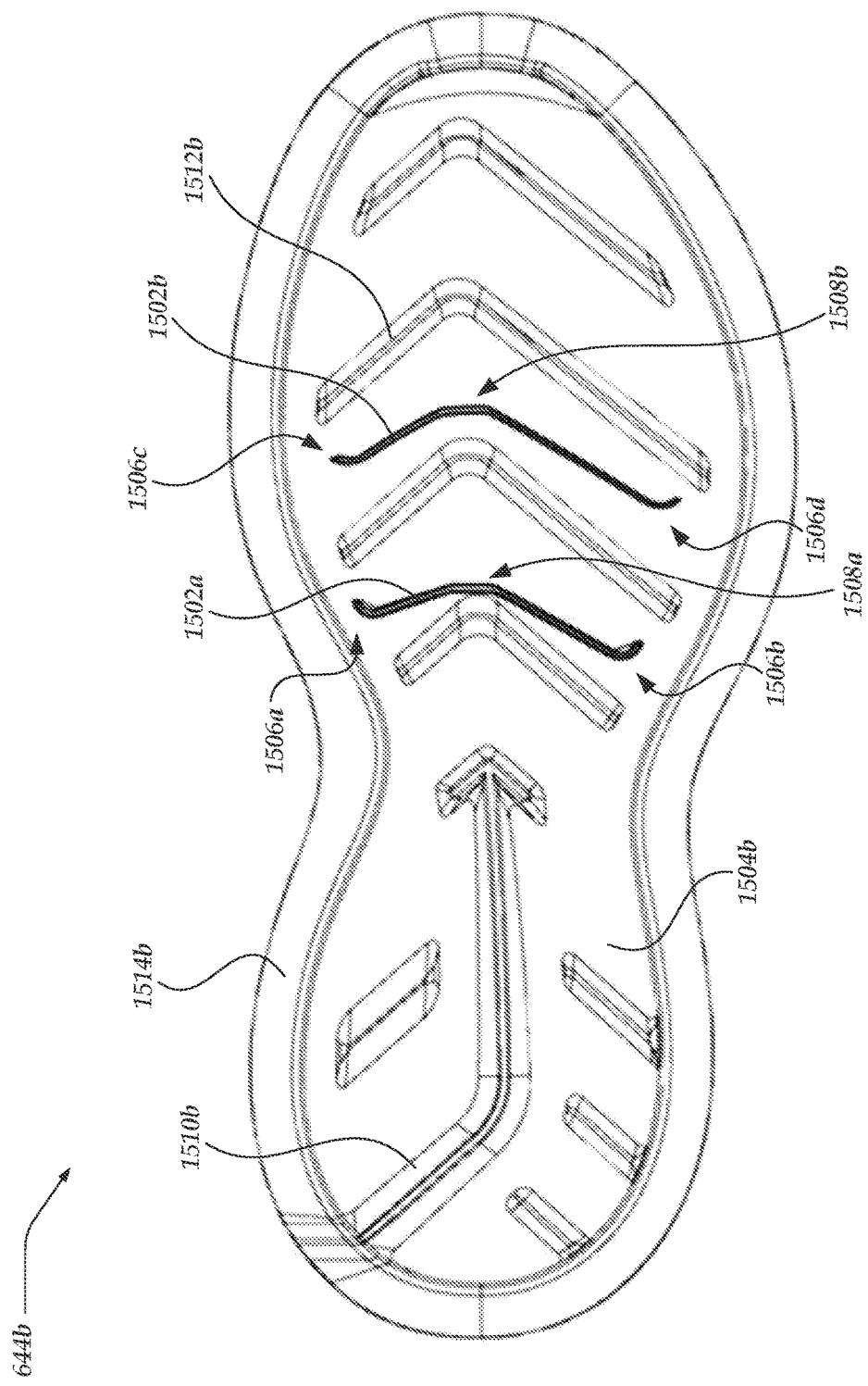
FIG. 16 illustrates a top view of the raw outsole with the injection dams of FIG. 15.

FIG. 15 shows perspective views of example raw outsole 644a (top) without injection dams and example raw outsole 644b (bottom) with one or more example injection dams (for example, rear injection dam 1502a or front injection dam 1502b), both prior to injecting the midsole. FIG. 16 illustrates a top view of raw outsole 644b of FIG. 15. As used herein, the term "raw outsole" refers to an outsole prior to one or more portions of midsole material bonding (for example, mechanically bonding or chemically bonding) to the outsole. In one or more of the various embodiments, the one or more injection dams may facilitate retaining injected midsole material at the toe-end side of the one or more injection dams to facilitate increasing the precision with which different zones of a midsole may be created as discussed further regarding FIGS. 17-20.

In one or more of the various embodiments, the one or more injection dams project upwardly from a top surface of an outsole body (for example, outsole body 1504a or outsole body 1504b) and extend laterally along the outsole body. In some of the various embodiments, one or more of the laterally outer end portions of the one or more injection dams (for example, one or more of laterally outer end portions 1506a may flare forward to facilitate retaining injected midsole fluid on the toe-end side of the one or more injection dams. In some embodiments, the middle portion may have one or more rearward extending curves or forward extending curves (for example, forward extending curve 1508a or forward extending curve 1508b). In some embodiments, a rearward extending curve may facilitate retaining fluid on the toe-end side of the injection dam. In some embodiments, a forward extending curve may facilitate positioning the injection dam between two or more non-dam ridges in the outsole body, such as non-dam ridges 1510a, 1510b, 1512a, or 1512b. In some embodiments, the one or more injection dams may extend higher above the upper surface of the outsole body than each of the one or more non-dam ridges or one or more perimeter ridges that extend around the perimeter of the outsole body, such as perimeter ridge 1514a or perimeter ridge 1514b. In other embodiments, the one or more injection dams may not extend as high above the upper surface of the outsole body as one or more portions of the one or more perimeter ridges.

In one or more of the various embodiments, the one or more injection dams may be seen from the bottom of the outsole body or may have bottom surfaces that are flush with the bottom surface of the outsole body. In contrast, for example, a bottom view of the outsole body typically reveals indents or grooves that have shapes that are inverse to the shapes of the one or more non-dam ridges that extend upwardly from the top surface of the outsole body. Accordingly, in some of the various embodiments, the one or more injection dams may not influence the tread on the bottom of the outsole body.

In one or more of the various embodiments, the one or more injection dams may be secured to the outsole body prior to injecting the midsole material into the internal volume of an injection mold (for example, internal volume 106 of hybrid mold 100) or prior to placing the outsole body in the internal volume of the injection mold. In some of the various embodiments, the one or more injection dams are secured to the outsole body with adhesive. In other embodiments, the one or more injection dams are secured to the outsole body by forming the outsole body around one or more portions of the injection dams. In some embodiments, the one or more injection dams have one or more flanges at the bottom end portion of the one or more dams (for example, one or more horizontally extending flanges), and the one or more flanges are encompassed in or the top surfaces of the one or more flanges are covered by the outsole body when the outsole body is formed. In other embodiments, the one or more injection dams have symmetrical top end portions and bottom end portions that each lack flanges.

In one or more of the various embodiments, the one or more injection dams may include one or more materials that are different than the one or more materials in the remainder of the raw outsole. For example, the one or more injection dams may include one or more metals or plastics that are not included in the remainder of the raw outsole, such as outsole body 1504a or outsole body 1504b.

Figure 17:
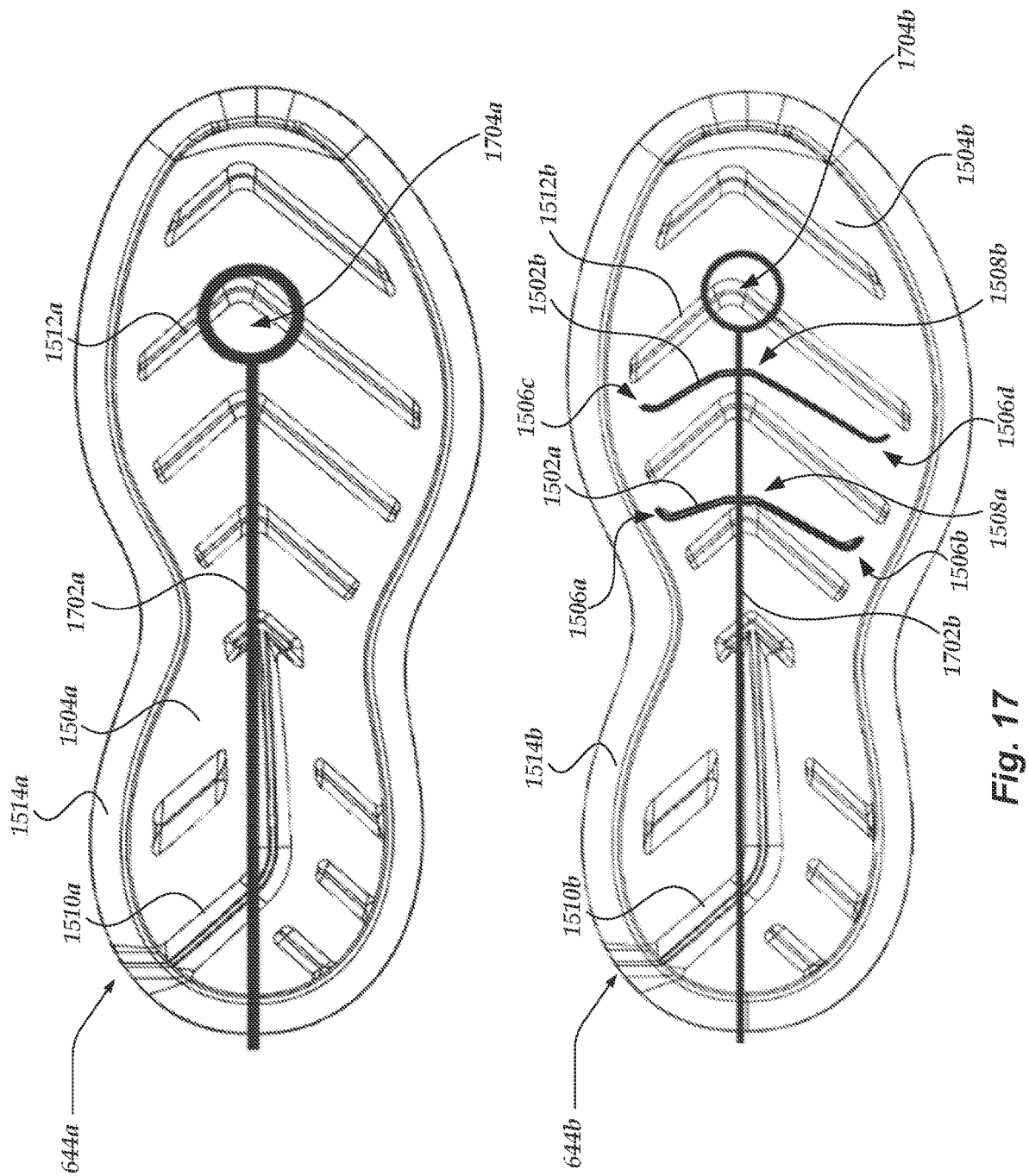
FIG. 17 shows top views of the raw outsoles of FIG. 15, with example injection paths and example injection targets for a first injection material.

FIG. 17 shows top views of raw outsole 644a and raw outsole 644b, with examples of intended injection paths 1702a and 1702b that respectively terminate at injection target 1704a and injection target 1704b for a first injection material. In one or more of the various embodiments, the injection pressure may be varied to adjust the longitudinal position of the injection target. In other embodiments, the injection target remains at the same location and, as more material is injected into the internal volume of the injection mold, subsequently injected material contacts the previously injected material, thereby forcing the later injected material to settle at a more rearward position than the previously injected material.

Figure 18:
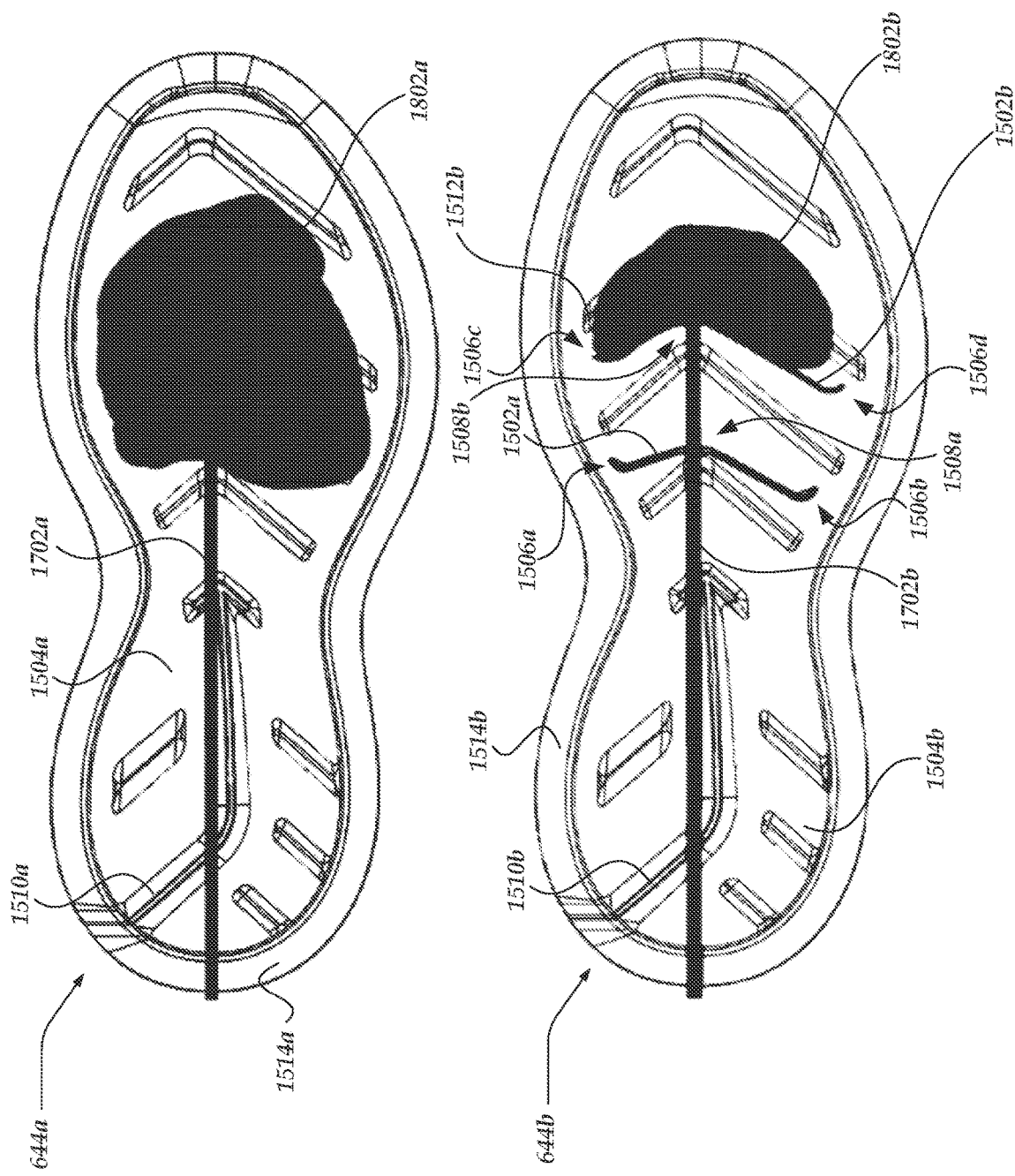
FIG. 18 illustrates top views of the outsoles of FIG. 15, with the injection paths for the first injection material and a portion of an example injection process for the first injection material.

FIG. 18 illustrates top views of the outsoles of FIG. 15. In one or more of the various embodiments, a cluster of a first injected midsole material forms in or around the injection target, such as cluster 1802a or cluster 1802b. In some of the various embodiments, the outsole has toe spring as shown and discussed regarding FIGS. 7 and 8. In some embodiments, the injection dams are employed during an injection process with a standard orientation of the internal volume of an injection mold (see FIG. 7) or a modified orientation of the internal volume of the injection mold (see FIG. 8). To emphasize the advantages of the injection dams, it is presumed that the injection dams are employed with the standard orientation of the internal volume of the injection mold. Accordingly, in some embodiments, gravity may encourage the first injected midsole material to flow rearward from the injection target toward the heel end portion of the outsole (see cluster 1802a on outsole 644a at top of FIG. 18). In some embodiments, injection dams may facilitate at least partially counteracting the force of gravity by retaining one or more portions of the first injected midsole material at the toe-end side of the injection dams (see cluster 1802b on outsole 644b at bottom of FIG. 18).

Figure 19:
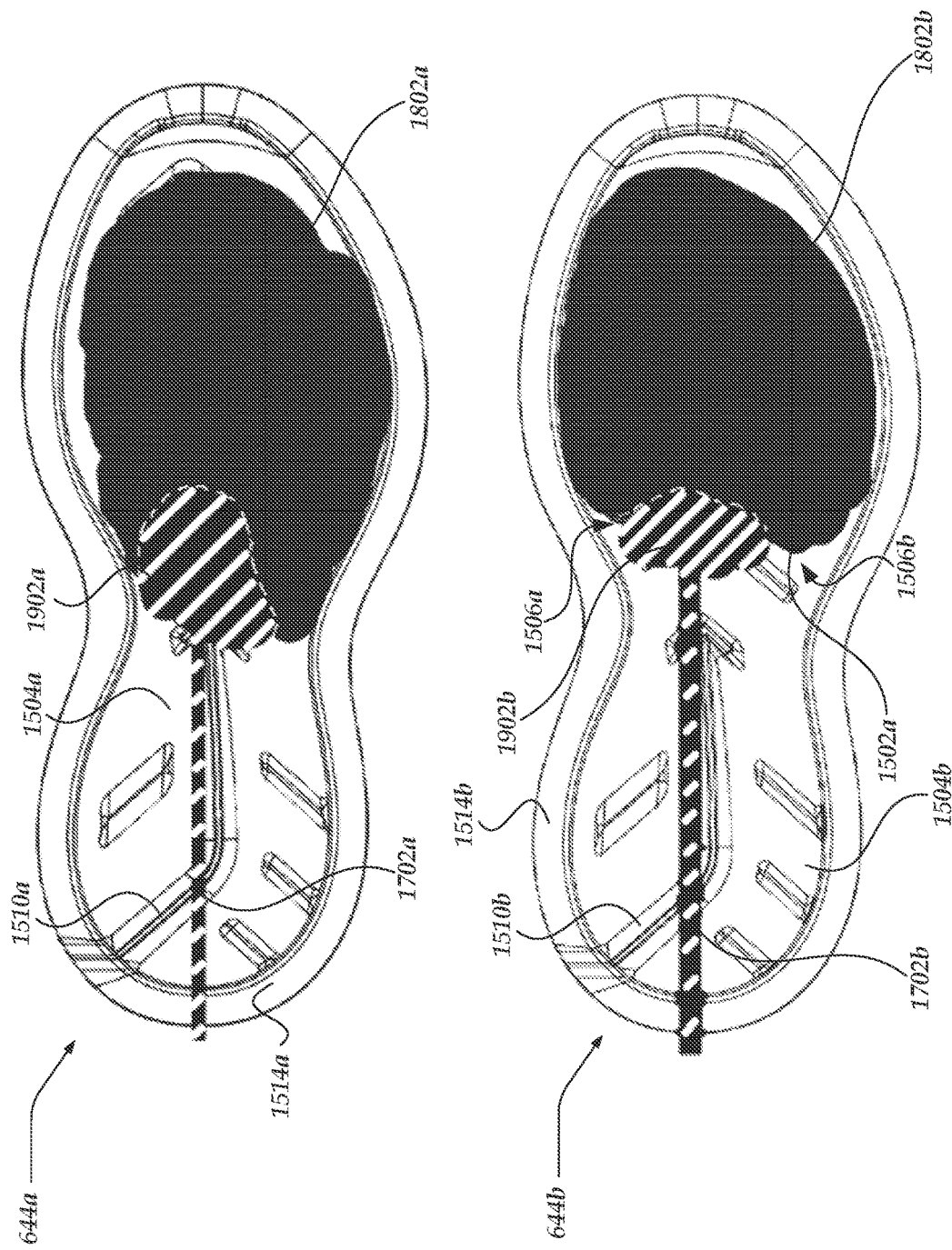
FIG. 19 shows top views of the outsoles of FIG. 15, with the injection process for the first injection material being complete and with example injection paths for a second injection material and a portion of an example injection process for the second injection material.
Figure 20:
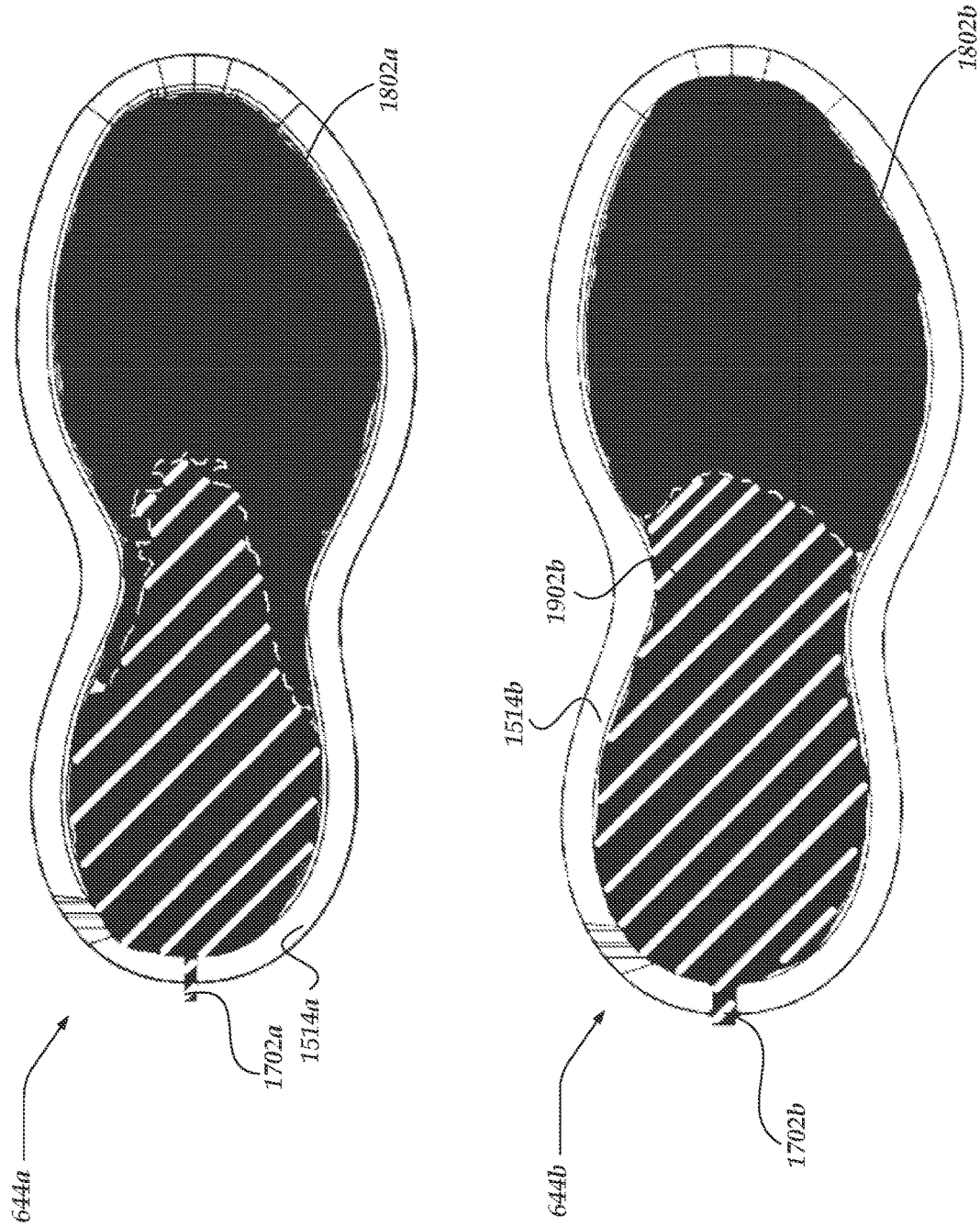
FIG. 20 illustrates top views of the outsoles of FIG. 15, with examples of the injection processes for the first and second injection materials being complete.

FIGS. 19 and 20 show top views of the outsoles of FIG. 15. FIG. 19 shows the injection process for the first midsole injection material being complete and an example second midsole injection material being injected along the injection path. FIG. 20 illustrates the injection process being complete for both the first injection material and the second injection material. In the example of FIGS. 19 and 20, the second injection material is shown with gray having white stripes, separated from the first injection material by a white dashed border. In one or more of the various embodiments, creating an injected midsole with multiple zones, with each zone having one or more materials that are different from one or more materials of one or more other zones, facilitates creating a midsole that has different properties in different zones (for example, greater cushioning properties in one zone and greater durability properties in another zone). Accordingly, in some of the various embodiments, it is advantageous to improve the precision of the zone positioning to facilitate improving the correlation between the position of a given zone having a given set of properties and the position of a portion of a wearer's foot that is intended to be associated with the given set of properties.

As shown at the tops of FIGS. 19 and 20, without the one or more injection dams, the cluster of the first injection material may continue to flow rearward and encroach on cluster 1902a of the second injection material until the injection material cures, thereby rendering manufacturing a multi-zoned midsole with different materials in each zone an imprecise process. In contrast, in some of the various embodiments, the one or more injection dams facilitate increasing the precision with which the multiple material zones may be created by retaining material of each zone in its intended position (see the bottom of FIGS. 19 and 20). In some embodiments, the one or more injection dams facilitate reducing the amount of the first injection material required because the one or more injection dams may facilitate less of the first injection material flowing rearward of the intended zone for the first material.

The directional terms "front," "rear," "top," "bottom," "upper," "lower," "top," "bottom," and variants thereof are used consistently with respect to all elements and are defined relative to the front surface the outer mold shell of hybrid mold 100, which, in the example of FIG. 1, is disposed opposite the toe end portion of internal volume 106 from the heel end portion. The terms "longitude," "lateral," "height," and variants thereof are also used consistently with respect to all elements and are defined relative to the longitudinal axis of hybrid mold 100. In the example of FIG. 1, the longitudinal axis of hybrid mold 100 extends along the intersection of left-side ring 102 and right-side ring 104, from the toe end portion toward the heel end portion. In the example of FIG. 1, the lateral axis of hybrid mold 100 is perpendicular to the longitudinal axis of hybrid mold 100 and extends through both left-side ring 102 and right-side ring 104. The height of hybrid mold is transverse to the longitudinal axis and the lateral axis of hybrid mold. The terms "left," "right," and variants thereof are used consistently with respect to all elements and are defined relative to the longitudinal axis of hybrid mold 100 as viewed, in the example of FIG. 1, from the heel end portion toward the toe end portion.

The foregoing examples should not be construed as limiting or exhaustive, yet rather, illustrative use cases to show implementations of at least one of the various embodiments of the invention. Accordingly, many changes can be made without departing from the spirit and scope of the invention. For example, although the foregoing examples discuss internal volume 106 as having a fixed orientation for each instance of hybrid mold 100, the orientation of one or more portions of hybrid mold 100 may alternatively be adjustable to facilitate increasing the degree of control over the flow of injected liquid. In some embodiments, the orientation may be adjusted by dynamically adjusting the offset of a carrier piston, which may thereby adjust the orientation of one or more carrier plates, prior to raising the carrier piston to bring the injected liquid into contact with the upper. Thus, the scope of the invention is not limited by the disclosure of the examples. Instead, the invention should be determined entirely by reference to the claims that follow.

The embodiments of the invention in which an exclusive property or privilege is claimed are defined as follows:

1. A hybrid mold for manufacturing footwear of various sizes or models having differing shapes with an automated injection molding machine, the hybrid mold comprising:
   a first hybrid side ring that includes a first outer mold shell and a set of first inner mold bodies corresponding to a plurality of footwear sizes or shapes, each of said bodies being removably couplable to the first outer mold shell, the first outer mold shell being situated apart from molding surfaces and being arranged for directly engaging outer side portions of the first inner mold bodies, each of the first inner mold bodies having a first inner mold surface specific to a particular footwear size for securement of a footwear upper of such size or shape; and
   a second hybrid side ring that includes a second outer mold shell and a set of second inner mold bodies corresponding to a plurality of footwear sizes or shapes, each of said bodies being removably couplable to the second outer mold shell, the second outer mold shell being situated apart from molding surfaces and being arranged for directly engaging outer side portions of the second inner mold bodies, each of the second inner mold bodies having a second inner mold surface specific to a particular footwear size or shape for securement of a footwear upper of such size or shape, the second inner mold surface of one of the set of second inner mold bodies, together with the first inner mold surface of one of the set of the first inner mold bodies, defines a first internal mold volume that defines a shape of one or more portions of a first footwear item of a particular size and shape to be manufactured.

2. The hybrid mold of claim 1, wherein the set of first inner mold bodies and the set of second inner mold bodies include different material than the first outer mold shell and the second outer mold shell.

3. A hybrid mold for manufacturing objects with an automated injection molding machine, the hybrid mold comprising:
   a first hybrid side ring that includes a first outer mold shell and a first inner mold body removably coupled to the first outer mold shell, the first inner mold body having a first inner mold surface, the first outer mold shell coupling to an outer side of the first inner mold body, the first outer mold shell being spaced from any object molding surface;
   a second hybrid side ring that includes a second outer mold shell and a second inner mold body removably coupled to the second outer mold shell, the second inner mold body having a second inner mold surface, the first outer mold shell coupling to an outer side of the first inner mold body, the first outer mold shell being spaced from any object molding surface, the second inner mold surface, together with the first inner mold surface of the first inner mold body, defines a first internal mold volume that defines a shape and size of one or more portions of a first object to be manufactured;
   a third inner mold body that removably couples to the first outer mold shell in place of the first inner mold body, the third inner mold body having a third inner mold surface; and a fourth inner mold body that removably couples to the second outer mold shell in place of the second inner mold body, the fourth inner mold body having a fourth inner mold surface that, together with the third inner mold surface of the third inner mold body, defines a second internal mold volume that defines a shape of one or more portions of a second object to be manufactured, the one or more portions of the second object having one or more shapes or sizes that are distinct from one or more corresponding shapes or sizes of the one or more portions of the first object.

* * * * *